(12) United States Patent
Wang et al.

(10) Patent No.: US 11,270,107 B2
(45) Date of Patent: Mar. 8, 2022

(54) EXTRACTION OF MULTI-MODAL ONLINE RESOURCES ASSOCIATED WITH RESEARCH PAPERS

(71) Applicant: FUJITSU LIMITED, Kawasaki (JP)

(72) Inventors: Jun Wang, San Jose, CA (US); Kanji Uchino, Santa Clara, CA (US)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 16/947,300

(22) Filed: Jul. 28, 2020

(65) Prior Publication Data
US 2022/0036064 A1 Feb. 3, 2022

(51) Int. Cl.
| G06F 17/00 | (2019.01) |
| G06K 9/00 | (2022.01) |
| G06K 9/62 | (2022.01) |
| G06F 40/205 | (2020.01) |
| G06F 40/177 | (2020.01) |
| G06F 40/103 | (2020.01) |

(52) U.S. Cl.
CPC ....... *G06K 9/00483* (2013.01); *G06F 40/103* (2020.01); *G06F 40/177* (2020.01); *G06F 40/205* (2020.01); *G06K 9/00456* (2013.01); *G06K 9/6256* (2013.01); *G06K 2209/27* (2013.01)

(58) Field of Classification Search
CPC ............ G06K 9/00483; G06K 9/00456; G06F 40/177; G06F 40/103
USPC .................................................. 715/201, 206
See application file for complete search history.

(56) References Cited

U.S. PATENT DOCUMENTS

| 9,563,623 | B2* | 2/2017 | Sawhney | G06F 16/9537 |
| 9,652,462 | B2* | 5/2017 | Zhao | G06F 16/951 |
| 10,747,774 | B2* | 8/2020 | Reynolds | G06F 21/6227 |
| 2003/0229598 | A1* | 12/2003 | de Jong | G06F 21/31 705/72 |
| 2007/0168578 | A1* | 7/2007 | Balchandran | G06F 3/048 710/18 |
| 2014/0351693 | A1* | 11/2014 | Glassop | G06F 40/166 715/235 |

(Continued)

OTHER PUBLICATIONS

Williams, 'A Web Service for Scholarly Big Data Information Extraction', 2014 IEEE International Conference on Web Services (Year: 2014).*

(Continued)

*Primary Examiner* — Stephen S Hong
*Assistant Examiner* — Matthew J Ludwig
(74) *Attorney, Agent, or Firm* — Fujitsu Patent Center

(57) ABSTRACT

A method includes storing a research paper and a set of candidate resources including media content. The method further includes encoding each of one or more first content fields in the research paper into a first vector based on a first field type associated with each of the one or more first content fields. The method further includes encoding each of one or more second content fields in each of the parsed set of candidate resources into a second vector, based on a second field type associated with each of the one or more second content fields. The method further includes comparing the first vector with the second vector to determine a final set of resources based on the comparison. The method further includes controlling a display screen to output the determined final set of resources and the research paper.

12 Claims, 10 Drawing Sheets

(56) References Cited

U.S. PATENT DOCUMENTS

| | | | |
|---|---|---|---|
| 2015/0120654 A1* | 4/2015 | Shan | G06F 16/275 707/610 |
| 2016/0292207 A1* | 10/2016 | Watanabe | G06F 40/197 |
| 2017/0235848 A1* | 8/2017 | Van Dusen | G06F 30/20 705/12 |
| 2018/0239825 A1* | 8/2018 | Tripathi | G06F 16/951 |
| 2019/0034976 A1* | 1/2019 | Hamedi | G06Q 30/0204 |
| 2019/0057146 A1* | 2/2019 | Jaroch | G06F 16/335 |
| 2020/0089712 A1* | 3/2020 | Tripathi | G06F 16/951 |
| 2020/0296118 A1* | 9/2020 | Chaula | H04L 63/1425 |
| 2021/0026897 A1* | 1/2021 | Rathje | G06F 16/3344 |
| 2021/0073237 A1* | 3/2021 | Wang | G06F 16/24575 |

OTHER PUBLICATIONS

Wenhua Yu, 'A Novel Practice Method To Classify Scholars Based on Research Subjects', 2016 Intl. IEEE Converences on Ubiquituous Intelligence & Computing (Year: 2016).*

Russell, A Design Pattern-based Video Summarization Technique: Moving from Low-Level Signals to High-Level Structure1, Proceedings of the 33rd Hawaii International Conference on System Sciences, IEEE (Year: 2000).*

Brandon Beamer and Roxana Girju. 2009. Investigating automatic alignment methods for slide generation from academic papers. In Proceedings of the Thirteenth Conference on Computational Natural Language Learning (CoNLL 09). Association for Computational Linguistics, USA, 111-119.

Fan, Quanfu & Barnard, Kobus & Amir, Arnon & Efrat, Alon. (2011). Robust Spatiotemporal Matching of Electronic Slides to Presentation Videos. Image Processing, IEEE Transactions on. 20. 2315-2328. 10.1109/TIP.2011.2109727.

Sida Wang, Xiaojun Wan, and Shikang Du. 2017. Phrase-based presentation slides generation for academic papers. In Proceedings of the Thirty-First AAAI Conference on Artificial Intelligence (AAAI'17). AAAI Press, 196-202.

* cited by examiner

EXTRACTION OF MULTI-MODAL ONLINE RESOURCES ASSOCIATED WITH RESEARCH PAPERS

FIELD

The embodiments discussed in the present disclosure are related to extraction of multi-modal online resources associated with research papers.

BACKGROUND

Typically, a researcher may study a large number of research papers to understand latest progress in a domain of interest. For example, a researcher may read a particular research paper and further identify and study one or more relevant research papers cited in the research paper. Generally, the researchers search for the one or more cited research papers on a search engine. The study and search may be a time consuming and may be a tedious task based on the domain of interest and prior knowledge of the researcher. In certain solutions, the researcher may manually search to find online resources (for example video, slides) scattered around web pages to get an overview of the identified research papers and the domain of interest. As may be evident, the manual process of search of the online resources associated with the research paper may be time consuming and cumbersome in case a large number of research papers. Thus, there is a need for an enhanced method to search and extract media content of online resources associated with research papers for effective understanding of the domain of interest for the researchers.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may be provided. The method may comprise extracting, from one or more first websites, one or more first resources based on a title associated with a research paper. The method may further include identifying a set of resource types associated with the extracted one or more first resources. The method may further include determining one or more first resource types from a predefined plurality of resource types based on the identified set of resource types. The set of resource types may exclude the determined one or more first resource types. The method may further include extracting, from one or more second websites, one or more second resources, associated with the determined one or more first resource types, based on the title associated with the research paper. The each of the one or more first resources and the one or more second resources may comprise media content. The method may further include determining a final set of resources based on a comparison between one or more first content fields of the research paper and one or more second content fields of the extracted one or more first resources and the extracted one or more second resources. The method may further include controlling a display screen to output the determined final set of resources and the research paper.

According to an aspect of another embodiment, a method may be provided. The method may include storing a set of candidate resources and a research paper, where each may include one or more content fields. The set of candidate resources may comprise media content and may be associated with the research paper. The method may further include encoding each of one or more first content fields in the research paper into a first vector based on a first field type associated with each of the one or more first content fields. The method may further include parsing each of the stored set of candidate resources into one or more second content fields. The method may further include encoding each of the one or more second content fields in each of the parsed set of candidate resources into a second vector, based on a second field type associated with each of the one or more second content fields. The method may further include comparing the first vector for each of the encoded one or more first content fields with the second vector for each of the encoded one or more second content fields. The method may further include determining a final set of resources based on the comparison. The method may further include controlling a display screen to output the determined final set of resources and the research paper.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
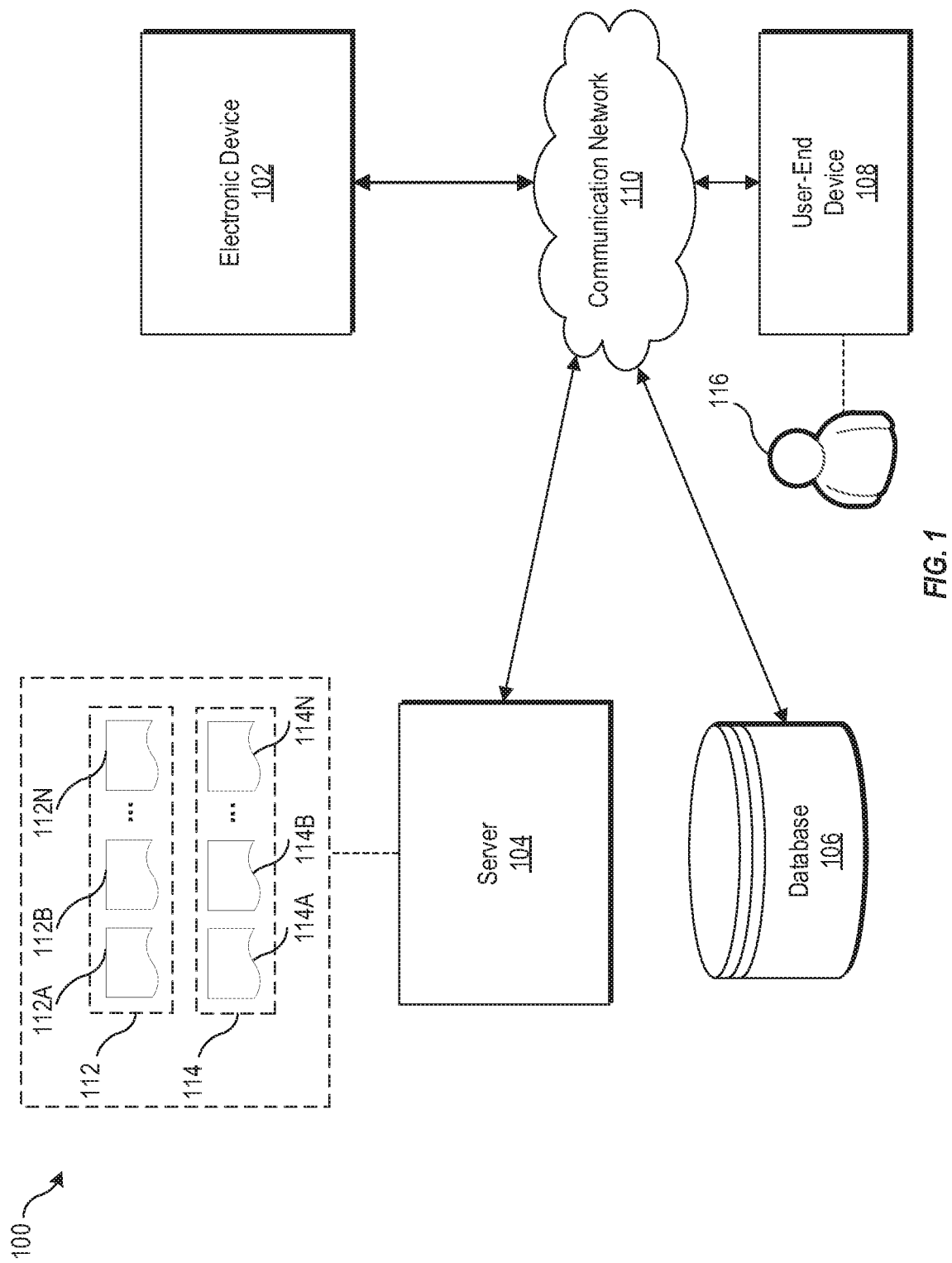
FIG. 1 is a diagram representing an example environment related to extraction of resources associated with a research paper from one or more websites.

Some embodiments described in the present disclosure relate to methods and systems for automated extraction of multi-modal online resources including media content (for example, videos, posters, presentations slides, or program codes) associated with research papers. In the present disclosure, one or more first resources may be extracted from one or more first websites based on a title associated with a research paper. A set of resource types associated with the one or more extracted first resources may be identified. Further, one or more first resource types may be determined from a predefined plurality of resource types (i.e., predefined target resource types to be extracted) based on the identified set of resource types. The set of resource types of the one or more extracted first resources may exclude the determined one or more first resource types. Herein, the one or more first resource types may correspond to those resource types in the predefined plurality of resource types that may be missing (or excluded) from the set of resource types associated with the extracted one or more first resources. One or more second resources associated with the determined one or more first resource types may be extracted from one or more second websites (e.g., a search engine), based on the title associated with the research paper. Herein each of the one or more first resources and the one or more second resources may include that media content may be related to the research paper. A final set of resources may be determined based on a comparison between one or more first content fields of the research paper and one or more second content fields of each of the extracted one or more first resources and the extracted one or more second resources. A display screen may be further controlled to output the determined final set of resources and the research paper.

In another embodiment described in the present disclosure relates to methods and systems for automated comparison of extracted multi-modal online resources (including the media content) with associated research papers. In the present disclosure, a set of candidate resources and a research paper may be stored. Each of the set of candidate resources and the research paper may include one or more content fields. The set of candidate resources may include the media content and may be associated with the research paper. The research paper may be parsed into one or more first content fields, while each of the stored set of candidate resources may be parsed into one or more second content fields. Each of the one or more first content fields in the parsed research paper may be encoded into a first vector based on a first field type associated with each of the one or more first content fields. Further, each of the one or more second content fields in the parsed set of candidate resources may be encoded into a second vector based on a second field type associated with each of the one or more second content fields. The first vector for each of the encoded one or more first content fields may be compared with the second vector for each of the encoded one or more second content fields. A final set of resources may be determined based on the comparison and a display screen may be controlled to output the determined final set of resources and the research paper.

According to one or more embodiments of the present disclosure, the technological field of media content resource extraction may be improved by configuring a computing system in a manner the computing system may be able to automatically extract online resources associated with a research paper and compare the extracted resources with the associated research paper to output a final set of online resources. The computing system may automatically extract the online resources associated with the research paper from one or more websites as candidate resources and compare the candidate resources with the research paper to determine a final set of resources associated with the research paper, as compared to other conventional solutions which may require significant manual inputs and effort to search and filter the online resources associated with the research paper from various websites.

The system may be configured to extract one or more first resources from one or more first websites, based on a title associated with a research paper. For example, the one or more first websites may be a conference, journal, or pre-print research paper publisher website, a personal or academic website, or a resource-specific website. Herein, a resource may include media content. Examples of the one or more first resources may include, but are not limited to, presentation slides, posters, videos, or program codes. The system may be further configured to identify a set of resource types associated with the extracted one or more first resources. The system may be further configured to determine one or more first resources types from a predefined plurality of resources types based on the identified set of resource types. Herein, the set of resource types may exclude the determined one or more first resource types. For example, the predefined plurality of resource types may include, but is not limited to, a research type, a poster type, a presentation slide type, a video type, or a program code type. In case, the set of resource types includes a research type (i.e., the research paper itself), a poster type, and a presentation slide type; then the determined one or more first resource types may include, but is not limited to, a video type or a program code type. In other words, the one or more first resource types may be missing in the set of resource types but present in the plurality of predefined resource types.

The system may be further configured to extract one or more second resources associated with the determined one or more first resource types from one or more second websites, based on the title associated with the resource paper. For example, if the determined one or more first resource types include the video type and the program code type resources, the one or more second websites (e.g., a search engine) may be searched to extract resources of the video type and the program code type. The extracted one or more second resources may be different from extracted the one or more first resources.

The system may be further configured to determine a final set of resources based on a comparison between one or more first content fields of the resource paper and one or more second content fields of the extracted one or more first resources and the extracted one or more second resources. For example, a title of the research paper may be compared with a title associated with each of extracted poster, presentation slides, or video (i.e. the extracted one or more first resources and the extracted one or more second resources). In an example, an author of the research paper may be compared with an author associated with each of the extracted poster, presentation slides, and video. Further, text, figures, or tables in the research paper may be compared with corresponding text, figures, and tables in each of the extracted poster, presentation slides, or video. Based on the automatic comparison and a successful match between the research paper and the extracted resources (e.g., the poster, presentation slides, video, or program codes), the matched resources may be determined as the final set of resources. The system may be further configured to control a display screen to output the determined final set of resources and the research paper, as aggregated multi-modal data. For example, the poster, presentation slides, video, or program codes (i.e., the final set of resources) may be displayed together with the research paper on an integrated user interface (UI) for the researcher.

According to one or more other embodiments of the present disclosure, the system may be configured to store a set of candidate resources and a research paper, each of which may include one or more content fields. The set of candidate resources may include the media content and the set of candidate resources may be associated with the research paper. For example, content related to a poster, presentation slides, a video, or a program code may be stored as the set of candidate resources. The system may be further configured to parse the research paper into one or more first content fields and each of the set of candidate resources into one or more second content fields. For example, the one or more first content fields may include, but is not limited to, a title, authors, date of publication, abstract, full text, figures, tables, or meta information associated with research paper. In an example, the one or more second content fields may include, but is not limited to, a title, authors, date of online upload of the resource, text, figures, tables, or meta information associated with the set of candidate resources.

The system may be configured to encode each of the one or more first content fields in the research paper into a first vector based on a first field type associated with each of the one or more first content fields. Similarly, the system may be configured to encode each of the one or more second content fields in the set of candidate resources into a second vector based on a second field type associated with each of the one or more second content fields. Each of the first field type and the second field type may include one of a textual field type, a categorical field type, a date-time field type, a figure field type, or a table field type.

The system may be configured to compare the first vector for each of the encoded one or more first content fields with the second vector for each of the encoded one or more second content fields. Based on the comparison, the system may be configured to determine a final set of resources from the set of candidate resources. For example, the system may add a first candidate resource from the set of candidate resources to the final set of resources, in case the first vector for the research paper matches with the second vector for the first candidate resource. Based on the comparison, the system may validate that the first candidate resource corresponds to the research paper. The system may be further configured to control a display screen to output the determined final set of resources and the research paper, as the aggregated multi-modal data. For example, the final set of resources may be displayed together with the research paper on an integrated UI for the researcher.

Typically, the researcher may wish to obtain an overview of multiple research papers of a domain of interest to understand the state of art of the domain. However, in the absence of an automation tool (such as the disclosed computing system), the researcher may need to manually search and extract online resources related to each research paper. Such manual approach may be tedious and time consuming as the researcher may have to manually access multiple scattered websites on the Internet and extract or download the accessed resources. The researcher may further have to manually verify whether content in each accessed online resource actually corresponds to the research paper. As may be evident, the manual process of search of the online resources associated with a research paper, and the aggregation of such online resources may be time consuming task and may not scale well for a batch of a large number of research papers. In contrast, the disclosed system may provide automated and enhanced extraction of multi-modal online resources (including media content) associated with a research paper, and provide an automated validation that the extracted online resources correspond to the research paper. Such automatic approach may save significant time of the researcher to search, extract, and/or validate the online resources (i.e. multi modal content) relevant to the research paper.

Embodiments of the present disclosure are explained with reference to the accompanying drawings.

FIG. 1 is a diagram representing an example environment related to extraction of resources associated with a research paper from one or more websites, arranged in accordance with at least one embodiment described in the present disclosure. With reference to FIG. 1, there is shown an environment 100. The environment 100 may include an electronic device 102, a server 104, a database 106, a user-end device 108, and a communication network 110. The electronic device 102, the server 104, the database 106, and the user-end device 108 may be communicatively coupled to each other, via the communication network 110. In FIG. 1, there is further shown one or more first websites 112 and one or more second websites 114. The server 104 may host the one or more first websites 112 and the one or more second websites 114. The one or more first websites 112 may include a website 112A, a website 112B, . . . and a website 112N. The one or more second websites 114 may include a website 114A, a website 114B, . . . and a website 114N. There is further shown a user 116 who may be associated with or operating the electronic device 102 or the user-end device 108.

The electronic device 102 may comprise suitable logic, circuitry, interfaces, and/or code that may be configured to extract one or more first resources from the one or more first websites 112 hosted by the server 104, based on a title associated with a research paper. For example, the one or more first websites 112 may include, but are not limited to, a conference, journal, or pre-print research paper publisher website, a personal or academic website, or a resource-specific website. Herein, a resource may include media content. Examples of the one or more first resources may include, but are not limited to, presentation slides, posters, videos, or program codes. The electronic device 102 may be further configured to identify a set of resource types associated with the extracted one or more first resources. The electronic device 102 may be further configured to determine one or more first resources types from a predefined plurality of resources types based on the identified set of resource types. Herein, the set of resource types may exclude the determined one or more first resource types as described, for example, in FIG. 4.

The electronic device 102 may be further configured to extract one or more second resources associated with the determined one or more first resource types from the one or more second websites 114 hosted by the server 104, based on the title associated with the resource paper. In an example, the one or more second websites 114 may be one or more search engine websites which may be different from the one or more first websites 112. The electronic device 102 may be further configured to determine a final set of resources based on a comparison between one or more first content fields of the resource paper and one or more second content fields of the extracted one or more first resources and the extracted one or more second resources. The one or more first content fields and the one or more second content fields and the comparison are described, for example, in FIGS. 5 and 7.

Based on the comparison and a successful match between the research paper and an extracted resource (e.g., a poster, presentation slides, video, or program code), the electronic device 102 may further determine the extracted resource as a resource which may be one of the final set of resources. The electronic device 102 may be further configured to control a display screen (such as a display screen 212 shown in FIG. 2) to output the determined final set of resources and the research paper. The extraction and display of the online resources associated with a research paper is explained further, for example, in FIGS. 4, 5, 6, and 9.

In another embodiment, the electronic device 102 may be configured to store a set of candidate resources and a research paper, each of which may include one or more content fields. The set of candidate resources may include media content and the set of candidate resources may be associated with the research paper. The electronic device 102 may be further configured to parse the research paper into one or more first content fields and each of the set of candidate resources into one or more second content fields as further described, for example, in FIGS. 5 and 7.

The electronic device 102 may be further configured to encode each of the one or more first content fields in the research paper into a first vector based on a first field type associated with each of the one or more first content fields. Similarly, the electronic device 102 may be further configured to encode each of the one or more second content fields in the set of candidate resources into a second vector based on a second field type associated with each of the one or more second content fields. Each of the first field type and the second field type may include one of a textual field type, a categorical field type, a date-time field type, a figure field type, or a table field type. The encoding of the one or more first content fields and the one or more second content fields is further described, for example, in FIG. 7.

The electronic device 102 may be further configured to compare the first vector for each of the encoded one or more first content fields with the second vector for each of the encoded one or more second content fields. Based on the comparison, the electronic device 102 may be configured to determine a final set of resources from the set of candidate resources. For example, the electronic device 102 may add a first candidate resource from the set of candidate resources to the final set of resources, in case the first vector for the research paper matches with the second vector for the first candidate resource. Based on the comparison, the electronic device 102 may validate that the first candidate resource corresponds to the research paper or not. The electronic device 102 may be further configured to control the display screen to output the determined final set of resources and the research paper. For example, the final set of resources may be displayed together with the research paper (as multi modal content) on an integrated user interface (UI). The automatic validation of extracted resources with the research paper is explained further, for example, in FIGS. 7 and 8. An exemplary integrated UI that may display the final set of resources and the research paper is explained further, for example, in FIG. 9.

Examples of the electronic device 102 may include, but are not limited to, a web wrapper device, a web search device, a search engine, a mobile device, a desktop computer, a laptop, a computer work-station, a computing device, a mainframe machine, a server, such as a cloud server, and a group of servers. In one or more embodiments, the electronic device 102 may include a user-end terminal device and a server communicatively coupled to the user-end terminal device. The electronic device 102 may be implemented using hardware including a processor, a microprocessor (e.g., to perform or control performance of one or more operations), a field-programmable gate array (FPGA), or an application-specific integrated circuit (ASIC). In some other instances, the electronic device 102 may be implemented using a combination of hardware and software.

The server 104 may comprise suitable logic, circuitry, interfaces, and/or code that may be configured to host one or more websites of a category. For example, the server 104 may host the one or more first websites 112 from which the one or more first resources may be extracted by the electronic device 102. Further, the server 104 may host the one or more second websites 114 from which the one or more second resources may be extracted by the electronic device 102. Examples of the server 104 may include, but are not limited to, a web server, a database server, a file server, a media server, an application server, a mainframe server, or a cloud computing server. In one or more embodiments, the electronic device 102 may include the server 104. The server 104 may be implemented using hardware including a processor, a microprocessor (e.g., to perform or control performance of one or more operations), a field-programmable gate array (FPGA), or an application-specific integrated circuit (ASIC). In some other instances, the server 104 may be implemented using a combination of hardware and software.

The database 106 may comprise suitable logic, interfaces, and/or code that may be configured to store the one or more first resources and the one or more second resources that may be extracted by the electronic device 102 from the one or more first websites 112 and the one or more second websites 114 hosted on the server 104. In an embodiment, the database 106 may store the set of candidate resources and the research paper. The database 106 may further store the one or more first content fields of the research paper and the one or more second content fields of each of the one or more first resources and the one or more second resources (or the one or more second content fields of the set of candidate resources). In addition, the database 106 may also store the final set of resources that may match with the research paper.

The database 106 may be a relational or a non-relational database. Also, in some cases, the database 106 may be stored on a server, such as a cloud server or may be cached and stored on the electronic device 102. In an embodiment, the server of the database 106 may be configured to receive a request for a research paper, a resource, or a content field of a research paper or a resource from the electronic device 102, via the communication network 110. In response, the server of the database 106 may be configured to retrieve and provide the requested research paper, resource, or content field to the electronic device 102 based on the received request, via the communication network 110. Additionally, or alternatively, the database 106 may be implemented using hardware including a processor, a microprocessor (e.g., to perform or control performance of one or more operations), a field-programmable gate array (FPGA), or an application-specific integrated circuit (ASIC). In some other instances, the database 106 may be implemented using a combination of hardware and software.

The user-end device 108 may comprise suitable logic, circuitry, interfaces, and/or code in which the integrated UI including the research paper and the final set of resources may be displayed. The user-end device 108 may include a web browser software or standalone software to display the integrated UI. In an embodiment, the user-end device 108 may receive a user input including the title or a Uniform Resource Locator (URL) of the research paper from the user 116. The user-end device 108 may include a graphical user interface (GUI) to receive the user input. The user-end device 108 may further provide the user input to the electronic device 102, via the communication network 110, to automatically search and extract the final set of resources related to the research paper indicated in the user input. The user-end device 108 may further receive the final set of resources from the electronic device 102 based on the provide user input. The web browser or the standalone software may display the integrated UI including the research paper and the final set of resources based on the received user input of the title or the URL of the research paper from the user 116. Examples of the user-end device 108 may include, but are not limited to, a web software development or testing device, a search engine device, a mobile device, a desktop computer, a laptop, a computer work-station, a computing device, a mainframe machine, a server, such as a cloud server, and a group of servers. Although in FIG. 1, the user-end device 108 is separated from the electronic device 102; however, in some embodiments, the user-end device 108 may be integrated in the electronic device 102, without a deviation from the scope of the disclosure.

The communication network 110 may include a communication medium through which the electronic device 102 may communicate with the server 104, the server which may store the database 106, and the user-end device 108. Examples of the communication network 110 may include, but are not limited to, the Internet, a cloud network, a Wireless Fidelity (Wi-Fi) network, a Personal Area Network (PAN), a Local Area Network (LAN), and/or a Metropolitan Area Network (MAN). Various devices in the environment 100 may be configured to connect to the communication network 110, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, and/or Bluetooth (BT) communication protocols, or a combination thereof.

Modifications, additions, or omissions may be made to FIG. 1 without departing from the scope of the present disclosure. For example, the environment 100 may include more or fewer elements than those illustrated and described in the present disclosure. For instance, in some embodiments, the environment 100 may include the electronic device 102 but not the database 106 and the user-end device 108. In addition, in some embodiments, the functionality of each of the database 106 and the user-end device 108 may be incorporated into the electronic device 102, without a deviation from the scope of the disclosure.

Figure 2:
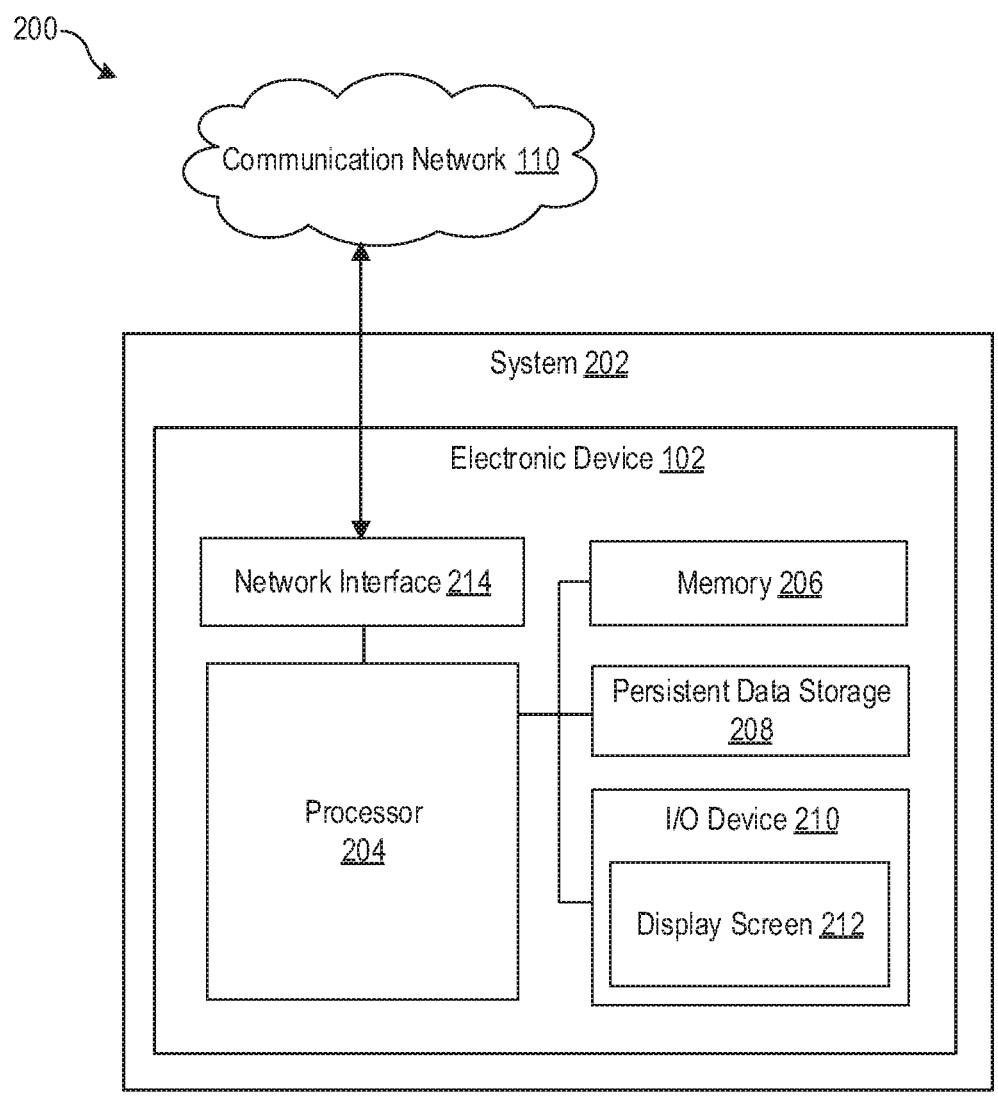
FIG. 2 is a block diagram that illustrates an exemplary electronic device for extraction of resources associated with a research paper from one or more websites.

FIG. 2 is a block diagram that illustrates an exemplary electronic device for extraction of resources associated with a research paper from one or more websites, arranged in accordance with at least one embodiment described in the present disclosure. FIG. 2 is explained in conjunction with elements from FIG. 1. With reference to FIG. 2, there is shown a block diagram 200 of a system 202 including the electronic device 102. The electronic device 102 may include a processor 204, a memory 206, a persistent data storage 208, an input/output (I/O) device 210, a display screen 212, and a network interface 214.

The processor 204 may comprise suitable logic, circuitry, and/or interfaces that may be configured to execute program instructions associated with different operations to be executed by the electronic device 102. For example, some of the operations may include extracting the one or more first resources, identifying the set of resource types, determining the one or more first resource types, and extracting the one or more second resources. The operations may further include storing the set of candidate resources and the research paper, parsing the research paper and each of the stored set of candidate resources, encoding each of the one or more first content fields, encoding each of the one or more second content fields, and comparing the first vector with the second vector. The operations may further include determining the final set of resources and controlling the display screen (e.g., the display screen 212) to display the final set of resources. The processor 204 may include any suitable special-purpose or general-purpose computer, computing entity, or processing device including various computer hardware or software modules and may be configured to execute instructions stored on any applicable computer-readable storage media. For example, the processor 204 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 2, the processor 204 may include any number of processors configured to, individually or collectively, perform or direct performance of any number of operations of the electronic device 102, as described in the present disclosure. Additionally, one or more of the processors may be present on one or more different electronic devices, such as different servers. In some embodiments, the processor 204 may be configured to interpret and/or execute program instructions and/or process data stored in the memory 206 and/or the persistent data storage 208. In some embodiments, the processor 204 may fetch program instructions from the persistent data storage 208 and load the program instructions in the memory 206. After the program instructions are loaded into the memory 206, the processor 204 may execute the program instructions. Some of the examples of the processor 204 may be a GPU, a CPU, a RISC processor, an ASIC processor, a CISC processor, a co-processor, and/or a combination thereof.

The memory 206 may comprise suitable logic, circuitry, interfaces, and/or code that may be configured to store program instructions executable by the processor 204. In certain embodiments, the memory 206 may be configured to store operating systems and associated application-specific information. The memory 206 may include computer-readable storage media for carrying or having computer-executable instructions or data structures stored thereon. Such computer-readable storage media may include any available media that may be accessed by a general-purpose or special-purpose computer, such as the processor 204. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 204 to perform a certain operation or group of operations associated with the electronic device 102.

The persistent data storage 208 may comprise suitable logic, circuitry, interfaces, and/or code that may be configured to store program instructions executable by the processor 204, operating systems, and/or application-specific information, such as logs and application-specific databases. The persistent data storage 208 may include computer-readable storage media for carrying or having computer-executable instructions or data structures stored thereon. Such computer-readable storage media may include any available media that may be accessed by a general-purpose or a special-purpose computer, such as the processor 204.

By way of example, and not limitation, such computer-readable storage media may include tangible or non-transitory computer-readable storage media including Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 204 to perform a certain operation or group of operations associated with the electronic device 102.

In some embodiments, either of the memory 206, the persistent data storage 208, or combination may store the one or more first resource, the one or more second resources, the set of candidate resources, the final set of resources, and the research papers. Either of the memory 206, the persistent data storage 208, or combination may further store the one or more first content fields of the research paper and the one or more second content fields of each of the one or more first resources and the one or more second resources (and/or one or more second content fields of the set of candidate resources).

The I/O device 210 may include suitable logic, circuitry, interfaces, and/or code that may be configured to receive a user input. For example, the I/O device 210 may receive the user input to including the title of the research paper or the URL of the research paper. The I/O device 210 may be further configured to provide an output in response to the user input. For example, the output may include the integrated UI that may display the final set of resources and the research paper. The I/O device 210 may include various input and output devices, which may be configured to communicate with the processor 204 and other components, such as the network interface 214. Examples of the input devices may include, but are not limited to, a touch screen, a keyboard, a mouse, a joystick, and/or a microphone. Examples of the output devices may include, but are not limited to, a display and a speaker.

The display screen 212 may comprise suitable logic, circuitry, interfaces, and/or code that may be configured to render the integrated UI that may display the final set of resources and the research paper. The display screen 212 may be configured to receive the user input from the user 116. The user input may include the title or the URL of the research paper. In such cases the display screen 212 may be a touch screen to receive the user input. The display screen 212 may be realized through several known technologies such as, but not limited to, a Liquid Crystal Display (LCD) display, a Light Emitting Diode (LED) display, a plasma display, and/or an Organic LED (OLED) display technology, and/or other display technologies.

The network interface 214 may comprise suitable logic, circuitry, interfaces, and/or code that may be configured to establish a communication between the electronic device 102, the server 104, the database 106, and the user-end device 108, via the communication network 110. The network interface 214 may be implemented by use of various known technologies to support wired or wireless communication of the electronic device 102 via the communication network 110. The network interface 214 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

Modifications, additions, or omissions may be made to the example electronic device 102 without departing from the scope of the present disclosure. For example, in some embodiments, the example electronic device 102 may include any number of other components that may not be explicitly illustrated or described for the sake of brevity.

Figure 3A:
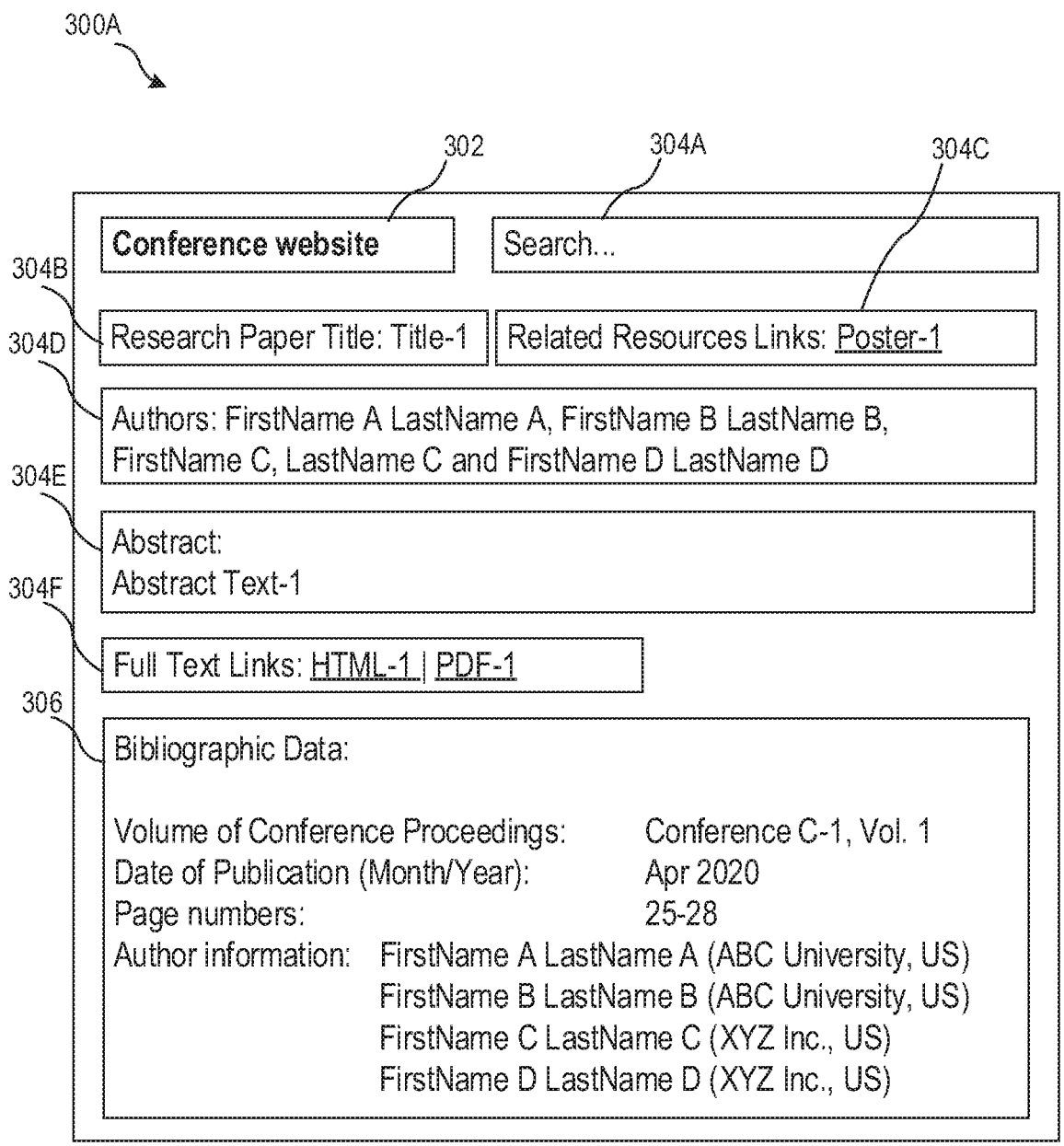
FIGS. 3A, 3B, and 3C, collectively illustrate, exemplary websites for extraction of resources associated with a research paper.
Figure 3B:
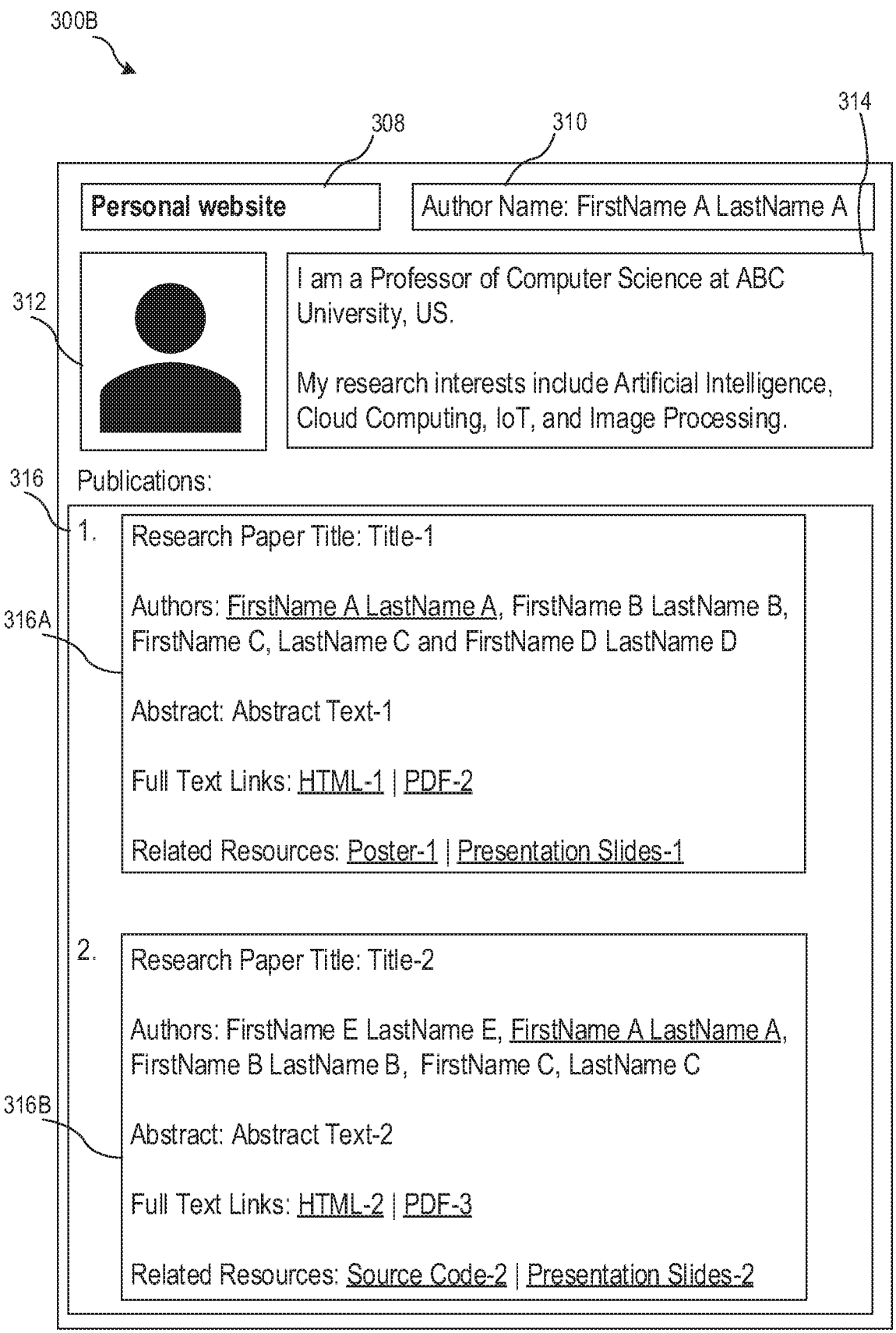
Figure 3C:
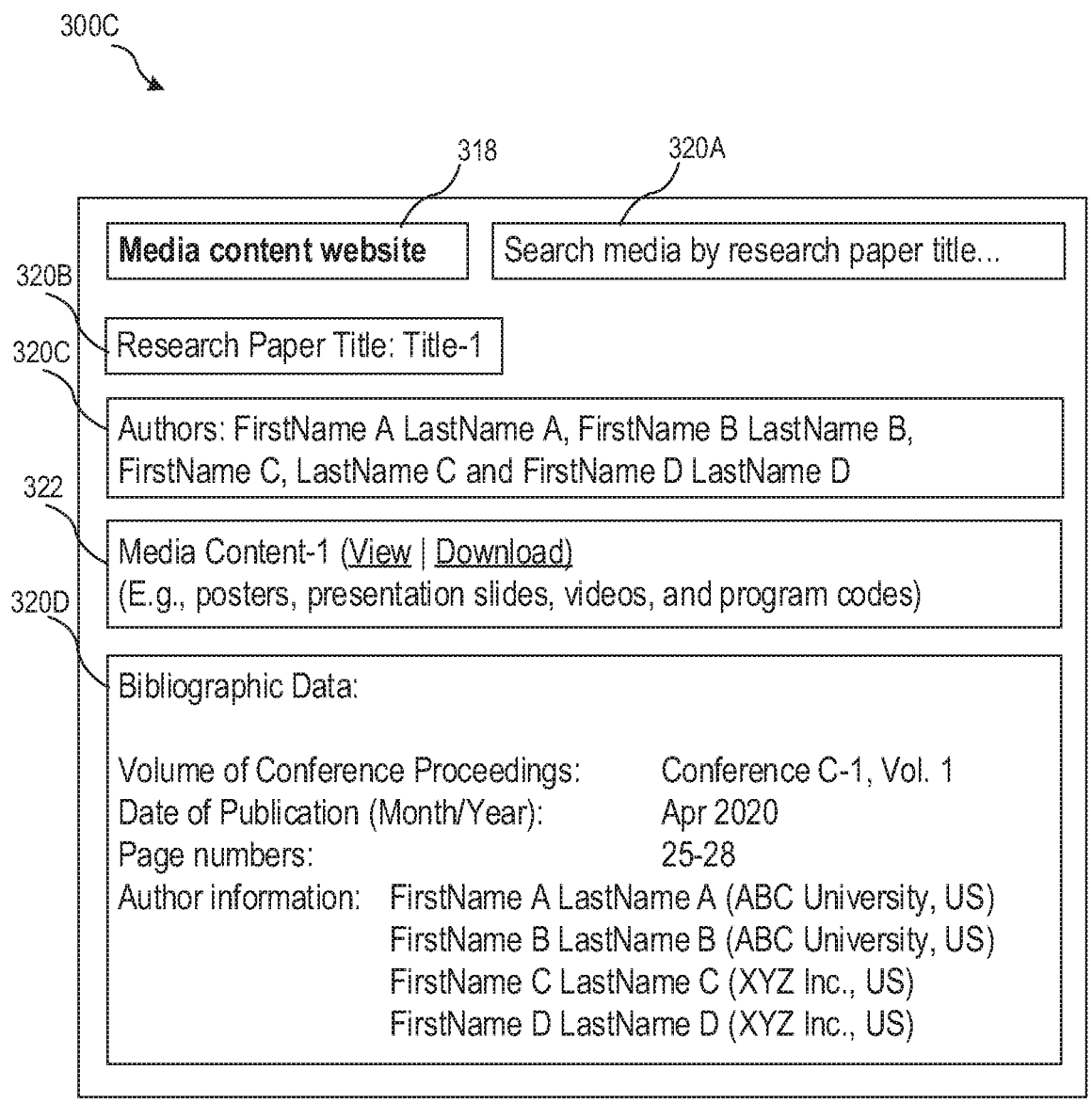

FIGS. 3A, 3B, and 3C, collectively illustrate, exemplary websites for extraction of resources associated with a research paper, arranged in accordance with at least one embodiment described in the present disclosure. FIGS. 3A, 3B, and 3C are explained in conjunction with elements from FIG. 1 and FIG. 2.

With reference to FIG. 3A, there is shown a first website 300A. The first website 300A may be a website associated with a conference, journal, or pre-print research paper publisher, which may be associated with or store research papers and one or more resources associated with each research paper. In FIG. 3A, there is shown, a name (such as, "Conference website", denoted by 302) of the first website 300A. The first website 300A may include a search box (such as, a search box 304A) to search for research papers by metadata and/or content fields associated with the research papers. For example, the electronic device 102 may receive a user input through the search box 304A from the user 116. The user input may include a title associated with a research paper. The first website 300A may search for the research paper based on the title and present information related to the searched research paper.

As shown in FIG. 3A, the first website 300A may display a title associated with the searched research paper (such as, "Research Paper Title: Title-1" denoted by 304B). The first website 300A may also display links of related resources associated with the searched research paper. For example, the first website 300A may display a link of a poster (e.g., Related Resources Links: "Poster-1", denoted by 304C) associated with the searched research paper. The first website 300A may further display name(s) of author(s) of the searched research paper (such as, "Authors: FirstName A LastName A, FirstName B LastName B, FirstName C LastName C, and FirstName D LastName D" denoted by 304D). The first website 300A may further display an abstract of the searched research paper (such as, "Abstract Text-1" denoted by 304E). Further, the first website 300A may display a full text of the searched research paper or a link to a file (such as, "Full Text Links: HTML-1|PDF-1"

denoted by 304F) including the full text. For example, the first website 300A may display a link to a Hypertext Markup Language (HTML) file (e.g., "HTML-1") of the full text or a link to a Portable Document Format (PDF) file (e.g., "PDF-1") of the full text. The first website 300A may further display bibliographic data (such as, denoted by 306) of the searched research paper. Examples of the bibliographic data may include, a volume of conference proceedings (e.g., "Conference C-1, Volume 1"), a date of publication (e.g., "April 2020"), page numbers (e.g., "25-28"), and author information (e.g., "FirstName A LastName A and FirstName B LastName B from ABC University, US; and FirstName C LastName C and FirstName D LastName D from XYZ Inc., US") as shown in FIG. 3A.

With reference to FIG. 3B, there is shown a second website 300B. The second website 300B may be a website associated with an academic or a personal webpage of an author of a research paper and/or an author of one or more resources associated with the research paper. There is shown in FIG. 3B, a name (such as, "Personal website" denoted by 308) of the second website 300B. The second website 300B may include an author name (such as, "Author name: FirstName A LastName A", denoted by 310). The second website 300B may further include a photo or portrait picture of the author (such as, a photo 312). As shown in FIG. 3B, the second website 300B may further include an introduction of the author including his/her profession, designation, organization, affiliation, or academic or personal interests. For example, the introduction of the author may be "I am a Professor of Computer Science at ABC University, US. My research interests include Artificial Intelligence, Cloud Computing, IoT, and Image Processing", as denoted by 314 in FIG. 3B.

As shown in FIG. 3B, the second website 300B may further include a list of publications (such as, denoted by 316) of the author (e.g., "FirstName A LastName A"). For example, the list of publications (such as, denoted by 316) may include a first research paper (such as, "Research Paper Title: Title-1" denoted by 316A) and a second research paper (such as, "Research Paper Title: Title-2" denoted by 316B). The first research paper may have a title as "Title-1", authors as "FirstName A LastName A, FirstName B LastName B, FirstName C LastName C, and FirstName D LastName D", and an abstract as "Abstract Text-1". The second website 300B may display a link to an HTML file (e.g., "HTML-1") and a link to a PDF file (e.g., "PDF-2"). The second website 300B may further display one or more resources related to the first research paper. For example, the second website 300B may display a link of a poster (e.g., "Poster-1") and a link of presentation slides (e.g., "Presentation Slides-1") as the one or more resources associated with the first research paper.

The second research paper (such as, denoted by 316B) may have a title as "Title-2", authors as "FirstName E LastName E, FirstName A LastName A, FirstName B LastName B, and FirstName C LastName C", and an abstract as "Abstract Text-2". The second website 300B may display a link to an HTML file (e.g., "HTML-2") and a link to a PDF file (e.g., "PDF-3"). The second website 300B may further include and display one or more resources related to the second research paper. For example, the second website 300B may display a link of a program code (e.g., "Source Code-2") and a link of presentation slides (e.g., "Presentation Slides-2") as one or more resources associated with the second research paper.

With reference to FIG. 3C, there is shown a third website 300C. The third website 300C may be a website associated with specific resources (such as, posters, presentation slides, videos, program codes or other media content) associated with research papers. The third website 300C may include databases to store specific resources which may be related to the research papers which may be searched by the user 116 (such as researcher). In an embodiment, the third website 300C may store one type of resources (for example videos). In another embodiment, the third website 300C may store multiple types of resources (for example combination of posters, presentation slides, videos, or program codes).

For example, there is shown in FIG. 3C, a name (such as, "Media content website" denoted by 318) of the third website 300C. The third website 300C may include a search box (such as, a search box 320A) to search for resources including the media content associated with the research paper. For example, the electronic device 102 may receive the user input through the search box 320A from the user 116. The user input may include a title associated with the research paper. The third website 300C may search for the research paper based on the title and present information related to the searched research paper, and further search for resources available on the third website 300C for the searched research paper.

As shown in FIG. 3C, as a result of search, the third website 300C may display a title associated with the searched research paper (such as, "Title-1" denoted by 320B). The third website 300C may further display name(s) of author(s) of the searched research paper (such as, "Authors: FirstName A LastName A, FirstName B LastName B, FirstName C LastName C, and FirstName D LastName D" as denoted by 320C in FIG. 3B). The third website 300C may further display bibliographic data (such as, denoted by 320D) of the searched research paper. Examples of the bibliographic data may include, a volume of conference proceedings (e.g., "Conference C-1, Volume 1"), a date of publication (e.g., "April 2020"), page numbers (e.g., "25-28"), and author information (e.g., "FirstName A LastName A and FirstName B LastName B from ABC University, US; and FirstName C LastName C and FirstName D LastName D from XYZ Inc., US") as shown in FIG. 3C.

The third website 300C may further display links of resources associated with the searched research paper. For example, the third website 300C may display links (such as, denoted by 322) to view and/or download media content (e.g., "Media Content-1"). The media content may include resources associated with the searched research paper. Examples of the media content may include, but are not limited to, posters, presentation slides, videos, and/or program codes. The poster and the presentation slides, as the resource, may provide quick and informative summary of the research paper. The video, as the resource, may provide vivid information for better understanding of the domain or concept included in the searched research paper. The program codes, as the resource, may provide information about detailed implementation related to the concepts mentioned in the searched research paper.

It should be noted that the first website 300A, the second website 300B, and the third website 300C shown in FIGS. 3A-3C are presented merely as examples and should not be construed to limit the scope of the disclosure.

Figure 4:
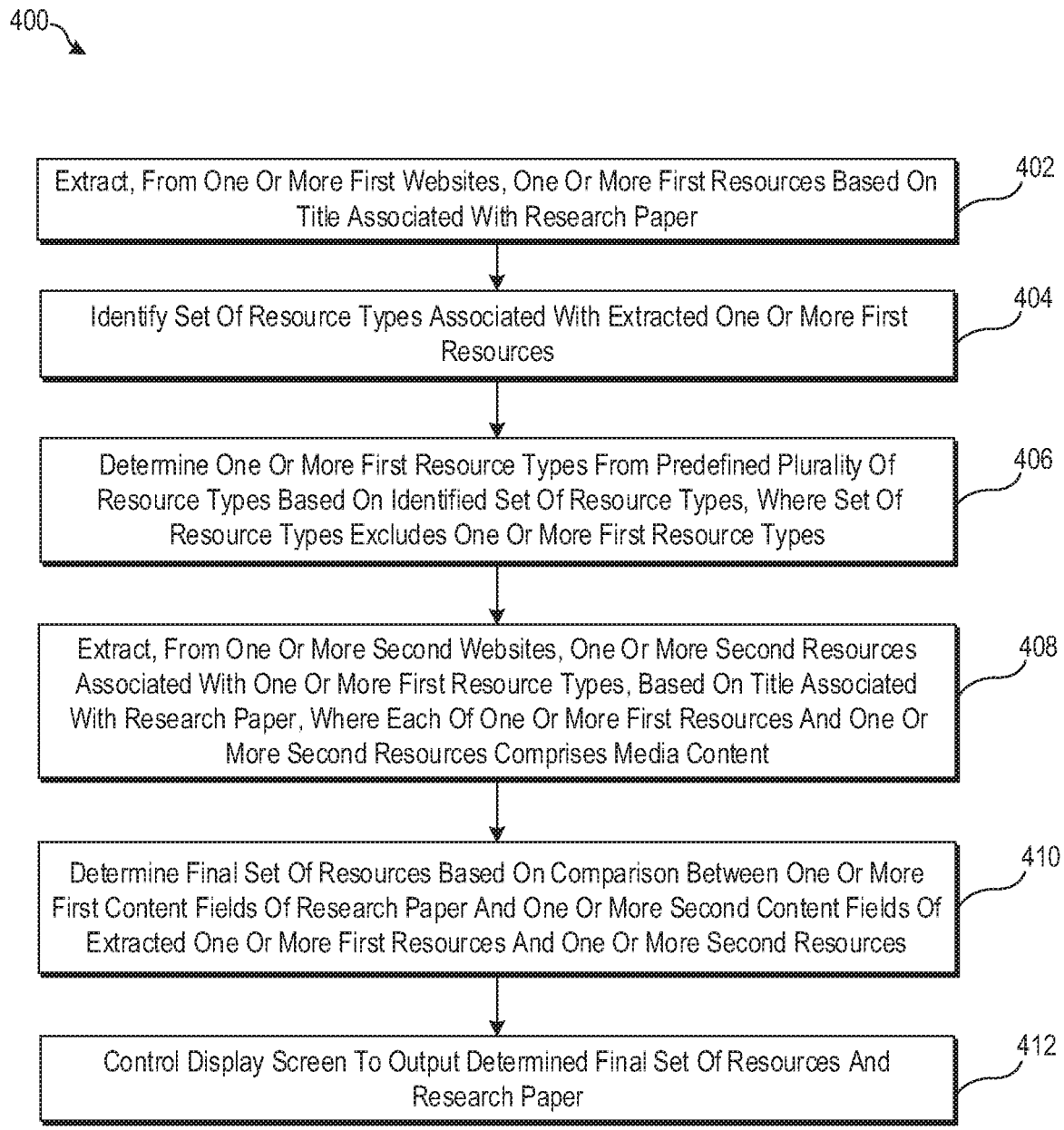
FIG. 4 illustrates a flowchart of an example method for extraction of online resources associated with a research paper.

FIG. 4 illustrates a flowchart of an example method for extraction of online resources associated with a research paper, arranged in accordance with at least one embodiment described in the present disclosure. FIG. 4 is explained in conjunction with elements from FIG. 1, FIG. 2, FIG. 3A, FIG. 3B, and FIG. 3C. With reference to FIG. 4, there is shown a flowchart 400. The method illustrated in the flowchart 400 may start at 402 and may be performed by any suitable system, apparatus, or device, such as by the example electronic device 102 of FIG. 1 or FIG. 2. Although illustrated with discrete blocks, the steps and operations associated with one or more of the blocks of the flowchart 400 may be divided into additional blocks, combined into fewer blocks, or eliminated, depending on the particular implementation.

At block 402, one or more first resources may be extracted from one or more first websites 112. In an embodiment, the processor 204 may be configured to extract the one or more first resources from the one or more first websites 112 based on a title associated with a research paper. Examples of the one or more first websites 112 may include, but are not limited to, a conference, journal, or pre-print research paper publisher website (e.g., the first website 300A), a personal or academic website (e.g., the second website 300B), or a resource-specific website (e.g., the third website 300C). In an embodiment, the processor 204 may extract a first set of resources from the first website 300A, a second set of resources from the second website 300B, and a third set of resources from the third website 300C. The one or more first resources may include the first set of resources, the second set of resources, and the third set of resources extracted from the one or more first websites 112. Examples of a resource in the one or more first resources may include, but are not limited to, presentation slides, posters, videos, or program codes. In an embodiment, the processor 204 may also extract the research paper from the one or more first websites 112. For example, along with the first set of resources, the processor 204 may extract the research paper from the first website 300A. In an embodiment, the processor 204 may extract the one or more first resources from the one or more first websites 112 based on the title of the research paper. For example, the processor 204 may provide the title of the research paper (which may be of interest to the user 116 or any other researcher or knowledge worker) to the first website 300A, the second website 300B, or the third website 300C to extract the one or more first resources (like poster, presentation slides, video, or program codes) which may also include or indexed by the same title (i.e. similar to the title of the research paper). In some embodiments, the processor 204 may extract the research paper from the one or more first websites 112 based on the title (or URL) of the research paper. In other embodiments, the processor 204 may be configured to extract the one or more first resources from the one or more first websites 112 based on other meta information of the research paper, such as, but not limited to, an author name, one or more keywords of abstract or description of the research paper.

In some embodiments, the processor 204 may be configured to crawl a first set of web pages associated with the first website 300A (e.g., a website associated with a conference, a journal, or a pre-print research paper publisher) for extraction of information (e.g., the first set of resources) from the first set of web pages. Further, the processor 204 may label or select one or more items in a sample web page of the first set of crawled web pages, based on a user input from a user (e.g., the user 116). The processor 204 may generate an initial extraction rule for extraction of a first item from the labelled one or more items of the sample web page based on a tree data structure and visual information associated with the first item. The processor 204 may refine the initial extraction rule to generate a new extraction rule for extraction of a second item (i.e. corresponding to the first item) from a target web page in the first set of crawled web pages.

The processor 204 may automatically and incrementally refine the new extraction rule for other target web pages for extraction of an item from each such target web page based on the visual information associated with the item to be extracted. The processor 204 may further extract the item from each such target web page in the first website 300A. The extracted item may correspond to the research paper and the first set of resources in the one or more first resources.

In some embodiments, similar to the extraction of the information (e.g., the first set of resources) from the first set of web pages associated with the first website 300A, the processor 204 may extract information from a second set of web pages associated with the third website 300C (e.g., a resource-specific website). The information extracted from the third website 300C may correspond to the third set of resources in the one or more first resources. In an example, in case the third website 300C hosts video resources associated with research papers, the third set of resources may include a video associated with the research paper.

In some embodiments, the processor 204 may be configured to automatically identify and extract distributed online resources (e.g., the second set of resources) from the second website 300B. The processor 204 may be configured to locate a candidate entry list page in the second website 300B. For example, the candidate entry list page may be located in the second website 300B based on a keyword search for a target keyword in links in a home page of the second website 300B. Herein, each link may include anchor text and/or a URL. A link list of links that include the target keyword may be created and a link from the link list may be selected as pointing to the candidate entry list page. The processor 204 may be configured to verify the candidate entry list page as an entry list page using repeated pattern discovery through a Document Object Model (DOM) tree of the candidate entry list page. The processor 204 may segment the entry list page into a plurality of entry items. From the plurality of entry items, the processor 204 may extract a plurality of candidate target pages by identification of one or more links in each entry item. Each of the one or more links may point to a corresponding one of the plurality of candidate target pages. The processor 204 may be configured to verify at least one of the candidate target pages as a target page based on analysis of a visual structure and presentation of the at least one of the candidate target pages to identify one or more information blocks in the at least one of the candidate target pages. The processor 204 may extract one or more keyword features from the one or more information blocks. The processor 204 may further classify the at least one candidate target pages as corresponding to a certain genre of pages and thereby as the target page based on at least one of the one or more keyword features. Finally, the processor 204 may then extract metadata and information from the target page, as the second set of resources extracted from the second website 300B (i.e. the website associated with an academic or a personal webpage).

For example, FLA11-025 U.S. Pat. No. 9,390,166 B2 filed on Dec. 31, 2012, which is incorporated by reference herein in its entirety, discusses online resource identification and extraction in detail. It may be noted that methods to extract information from web pages by the referenced application are merely an example. Although, there may be different other ways to extract information from web pages, without departure from the scope of the disclosure.

In an embodiment, the processor 204 may be further configured to index the extracted items corresponding to the research paper and the one or more first resources, and store the indexed extracted items in the database 106, the memory 206, the persistent data storage 208, or a combination thereof. In another embodiment, the processor 204 may be configured to separately index items corresponding to the research paper and/or the first set of resources, items corresponding to the second set of resources, and items corresponding to the third set of resources. In such scenario, the processor 204 may store such separately indexed items in separate databases, such as a first database (for the research paper and/or the first set of resources), a second database (for the second set of resources), and a third database (for the third set of resources). In an embodiment, the first database, the second database, and the third database may be associated with the database 106, the memory 206, the persistent data storage 208, or a combination thereof.

In an example, the first database may correspond to a database for central domain-specific data which may include the research paper and the first set of resources extracted from the first website 300A (e.g., a conference, journal, or pre-print research paper publication website). The second database may correspond to a database for scattered domain-specific data which may include the second set of resources extracted from the second website 300B (e.g., an academic or personal website). The third database may correspond to a database for specific resources data which may include the third set of resources extracted from the third website 300C (e.g., a resource-specific website).

At block 404, a set of resource types associated with the extracted one or more first resources may be identified. In an embodiment, the processor 204 may be configured to identify the set of resource types associated with the extracted one or more first resources extracted from the one or more first websites 112. In some embodiment, the processor 204 may identify the resources type of a resource (i.e. in the extracted one or more first resources) as a video type or a program code type based on a URL associated with the resource. For example, the processor 204 may compare the URL of the resource with a list of known URLs of resources of video or program code type to determine whether the resource is of the video type or the program code type respectively.

In some embodiments, the processor 204 may further identify the resource type of the resource, such as the research paper, presentation slides, or posters, based on page layout analysis. The processor 204 may identify the resource type (i.e. in the set of resource types) of such resources as the research paper type, the presentation slide type, or the poster type. The processor 204 may convert each page in such resources into an image. For example, the processor 204 may convert the page into a corresponding image based on screen capture or document-to-image conversion technique. The processor 204 may identify the resource type of the resources by application of a pre-trained image classifier on the image. The image classifier may be pre-trained using deep learning techniques to classify the extracted resources (or converted images) into the corresponding resource types as one of the research paper type, the presentation slide type, or the poster type based on a layout of the page associated with the corresponding image.

At block 406, one or more first resource types may be determined from a plurality of predefined resource types based on the identified set of resource types. In an embodiment, the processor 204 may be configured to determine the one or more first resource types from the plurality of predefined resource types based on the set of resource types identified from the extracted one or more first resources. In an embodiment, the set of resource types may exclude the one or more first resource types. For example, the predefined plurality of resource types may include, but is not limited to, a research paper type, a poster type, a presentation slide type, a video type, or a program code type. In case, the set of resource types includes a research paper type (i.e., the research paper itself), the poster type, and the presentation slide type; then the determined one or more first resource types may include the video type and the program code type. In other words, the one or more first resource types may be missing in the set of resource types but present in the plurality of predefined resource types. In other words, the processor 204 may determine the missing types of resources (i.e. one or more first resource types) to determine the types of resources (for example the video type or the program code type) which may not be extracted from the one or more first websites 112 at step 402 or not available in the one or more first websites 112.

At block 408, one or more second resources associated with the one or more first resource types may be extracted from one or more second websites 114 based on the title associated with the research paper. In an embodiment, the processor 204 may be configured to extract the one or more second resources associated with the one or more first resource types (determined at step 406) from the one or more second websites 114, based on the title associated with the research paper. The server 104 may host the one or more second websites 114. Examples of the one or more second websites may include, but are not limited to, one or more search engine websites. In an embodiment, each of the one or more first resources (extracted at step 402) and the one or more second resources (extracted at step 406) may include the media content for examples, but not limited to, presentation slides, posters, videos, or program codes. In an example, if the one or more first resources types (determined at step 406) includes the video type and the program code type, the one or more second resources may include the video and the program code (i.e. resources that were missing in the one or more first resources extracted from the one or more first websites 112 at step 402).

In an example, the processor 204 may extract or search for the resources of the video resource type on the search engines associated with video content, based on the title of the research paper. For search or extraction of the resources of the program code type, the processor 204 may search on the search engines or databases including public or private source-code repositories. In an example, in case of the determined one or more first resources types as the presentation slide type or the poster type, the processor 204 may search for the presentation slides and the posters on generic search engines based on the title of the research paper and one or more search operators (for example a filetype restriction, such as, "filetype: pdf" for Portable Document Format (PDF) files or "filetype: ppt" for presentation slides).

At block 410, a final set of resources may be determined based on a comparison between one or more first content fields of the research paper and one or more second content fields of the extracted one or more first resources and the one or more second resources. In an embodiment, the processor 204 may be configured to determine the final set of resources based on the comparison between the one or more first content fields of the research paper and the one or more second content fields of the extracted one or more first resources and the extracted one or more second resources (i.e. extracted at steps 402 and 408). The extraction of the one or more first content fields and the one or more second content fields is explained further, for example, in FIG. 5. In some embodiments, the final set of resources may be determined based on merger of the extracted one or more first resources and extracted the one or more second resources of same type as described further, for example, in FIG. 6. The determination of the final set of resources is described further, for example, in FIG. 7 and FIG. 8.

At block 412, a display screen may be controlled to output the final set of resources and the research paper. In an embodiment, the processor 204 may be configured to control the display screen (such as, the display screen 212 of the electronic device 102) to output the determined final set of resources and the research paper. In some embodiments, the processor 204 may output an integrated UI that may display the final set of resources and the research paper together on the display screen 212. An exemplary integrated UI that may display the final set of resources and the research paper is described, for example, in FIG. 9. Control may pass to end.

Although the flowchart 400 is illustrated as discrete operations, such as 402, 404, 406, 408, 410, and 412. However, in certain embodiments, such discrete operations may be further divided into additional operations, combined into fewer operations, or eliminated, depending on the particular implementation without detracting from the essence of the disclosed embodiments.

Figure 5:
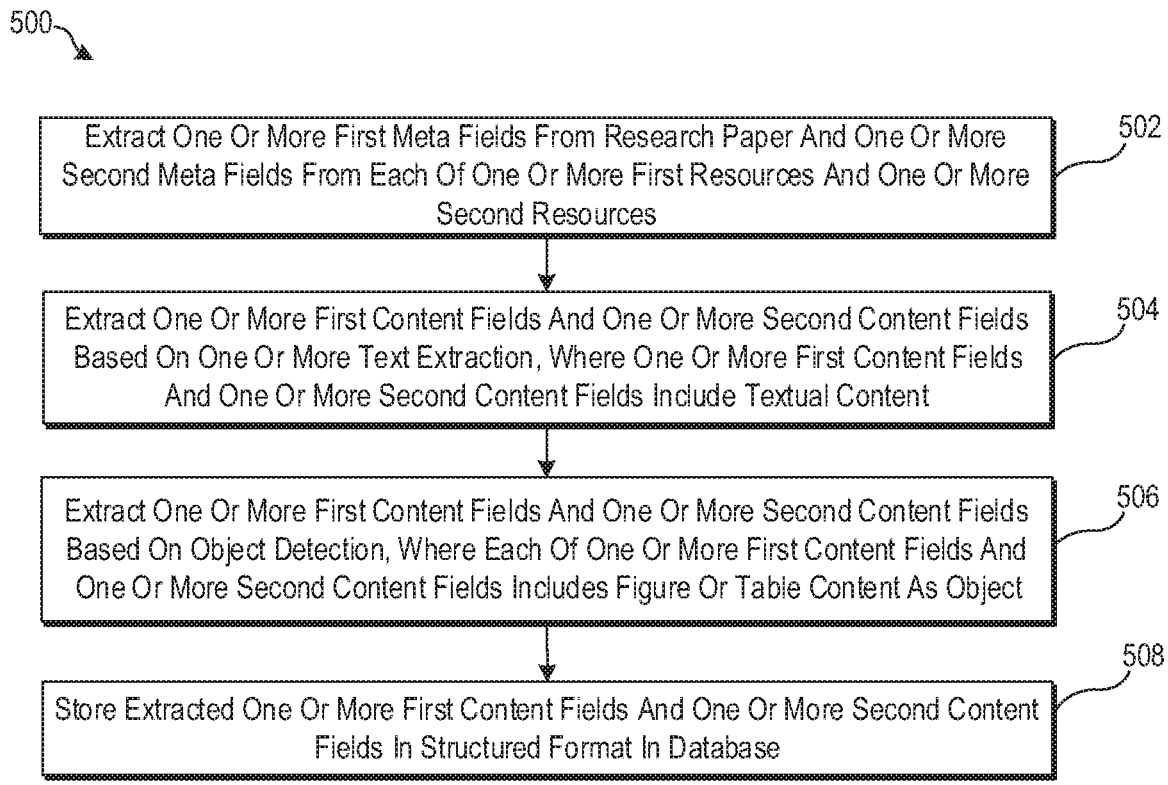
FIG. 5 illustrates a flowchart of an example method for extraction of one or more first content fields of a research paper and one or more second content fields of each of one or more resources associated with the research paper.

FIG. 5 illustrates a flowchart of an example method for extraction of one or more first content fields of a research paper and one or more second content fields of each of one or more resources associated with the research paper, arranged in accordance with at least one embodiment described in the present disclosure. FIG. 5 is explained in conjunction with elements from FIG. 1, FIG. 2, FIG. 3A, FIG. 3B, FIG. 3C, and FIG. 4. With reference to FIG. 5, there is shown a flowchart 500. The method illustrated in the flowchart 500 may start at 502 and may be performed by any suitable system, apparatus, or device, such as by the example electronic device 102 of FIG. 1 or FIG. 2. Although illustrated with discrete blocks, the steps and operations associated with one or more of the blocks of the flowchart 500 may be divided into additional blocks, combined into fewer blocks, or eliminated, depending on the particular implementation.

At block 502, one or more first meta fields may be extracted from the research paper and one or more second meta fields may be extracted from each of the one or more first resources and one or more second resources. In an embodiment, the processor 204 may be configured to extract the one or more first meta fields from the research paper and the one or more second meta fields from at least one resource of the one or more first resources and the one or more second resources (extracted in steps 402 and 408 in FIG. 4). In certain embodiments, the at least one resource may include each of the one or more first resources and the one or more second resources. In another embodiment, the at least one resource may include the one or more first resources (or just the first set of resources extracted from the first website 300A).

In some embodiments, the processor 204 may be configured to search the database 106 based on the title of the research paper to determine a set of meta fields associated with the research paper. In an example, the processor 204 may search the first database (i.e. the database for central domain-specific data) of the database 106 based on the title of the research paper to determine the set of meta fields associated with the research paper. The first database may include the research paper and the first set of resources that may be extracted from the first website 300A. As the first website 300A may include more comprehensive meta fields of the research paper, the processor 204 may check whether all comprehensive meta fields in the set of meta fields have already been extracted from the research paper, the one or more first resources, and/or the one or more second resources. In an embodiment, in case all meta fields in the set of meta fields are not extracted for the research paper, the one or more first resources, and/or the one or more second resources, the processor 204 may perform step 502 to extract the one or more first meta fields and the one or more second meta fields.

Examples of the one or more first meta fields of the research paper may include, but is not limited to, a title, author(s), institute(s), venue of a conference or journal, a date of paper presentation, submission, or the conference. In an embodiment, the processor 204 may determine the one or more first meta fields based on layout analysis of a content file associated with the research paper. For example, the processor 204 may use a PDF extraction technique for extraction of the one or more first meta fields from a PDF file of the research paper. In another example, the processor 204 may use an Optical Character Recognition (OCR) technique for extraction of the one or more first meta fields from a scanned document of the research paper.

In an embodiment, similar to the extraction of the one or more first meta fields, the processor 204 may extract the one or more second meta fields from the extracted resources (such as video, posters, presentation slides, or program codes) associated with the research paper. The processor 204 may be configured to extract the one or more second meta fields of a video by extraction of a title, a description, author(s), and a date-time of a video post. The processor 204 may be configured to extract the one or more second meta fields of a program code by extraction of author(s) name, a description, a readme text, and a date-time of an upload of the program code.

At block 504, the one or more first content fields and the one or more second content fields may be extracted based on text extraction. In an embodiment, the processor 204 may be configured to extract the one or more first content fields of the research paper and the one or more second content fields of each of the one or more first resources and the one or more second resources based on the text extraction. Herein, the one or more first content fields and the one or more second content fields may include or correspond to textual content (for example the title, author name, or full description). For example, the processor 204 may use a PDF text extraction to extract the one or more first content fields from a PDF file of the research paper, and extract the one or more second content fields from a PDF file of the at least one resource (i.e., the one or more first resources and/or the one or more second resources; or just the first set of resources extracted from the first website 300A). In another example, the processor 204 may use an OCR technique for extraction of the one or more first content fields from a scanned document of the research paper and the one or more second content fields from a scanned document of the at least one resource.

At block 506, the one or more first content fields and the one or more second content fields may be extracted based on object detection. In an embodiment, the processor 204 may be configured to extract the one or more first content fields of the research paper and the one or more second content fields of the at least one resource (i.e., the one or more first resources and/or the one or more second resources; or just the first set of resources extracted from the first website 300A), based on the object detection. Herein, the one or more first content fields and the one or more second content fields may include (or correspond to) figure or table content (as one or more objects) included in the research paper and the extracted resources.

For example, the processor 204 may convert each page (including figures or tables) in the research paper or a resource into an image. In an example, the processor 204 may convert a page into a corresponding image by use of a screen capture or document-to-image conversion technique. The processor 204 may perform object detection on the converted image using neural network (such as, deep learning) to detect and extract figure or table content from the research paper and the extracted resources. Examples of the neural network may include, but are not limited to, a deep neural network (DNN), a convolutional neural network (CNN), a recurrent neural network (RNN), a CNN-recurrent neural network (CNN-RNN), R-CNN, Fast R-CNN, Faster R-CNN, an artificial neural network (ANN), (You Only Look Once) YOLO network, a Long Short Term Memory (LSTM) network based RNN, CNN+ANN, LSTM+ANN, a gated recurrent unit (GRU)-based RNN, a fully connected neural network, a Connectionist Temporal Classification (CTC) based RNN, a deep Bayesian neural network, a Generative Adversarial Network (GAN), and/or a combination of such networks. In some embodiments, learning engine associated with the neural network may include numerical computation techniques using data flow graphs. In certain embodiments, the neural network may be based on a hybrid architecture of multiple Deep Neural Networks (DNNs). In an example, the processor 204 may use Detectron based neural network to detect and extract the figures. Further, the processor 204 may use a transfer learning on a table dataset such as, but not limited to, TableBank, to detect and extract the tables from the research paper and the extracted resources (i.e. one or more first resources and the one or more second resources).

At block 508, the extracted one or more first content fields and the one or more second content fields may be stored. In an embodiment, the processor 204 may be configured to store the extracted one or more first content fields of the research paper and the one or more second content fields of the at least one resource (i.e., the one or more first resources and/or the one or more second resources; or just the first set of resources extracted from the first website 300A) in the database 106 in a structured format. In an example, the processor 204 may store the one or more first content fields of the research paper and the one or more second content fields of the first set of resources in the first database of the database 106. Further, the processor 204 may store the one or more second content fields of the second set of resources in the second database of the database 106 and the one or more second content fields of the third set of resources in the third database of the database 106. Examples of the structured format (which may correspond to a key-value pairs for content fields and corresponding values) may include, but not limited to, a Java Script Object Notation (JSON) format, an eXtensible Markup Language (XML) format, or a Comma Separated Values (CSV) format. Control may pass to end.

Although the flowchart 500 is illustrated as discrete operations, such as 502, 504, 506, and 508. However, in certain embodiments, such discrete operations may be further divided into additional operations, combined into fewer operations, or eliminated, depending on the particular implementation without detracting from the essence of the disclosed embodiments.

Figure 6:
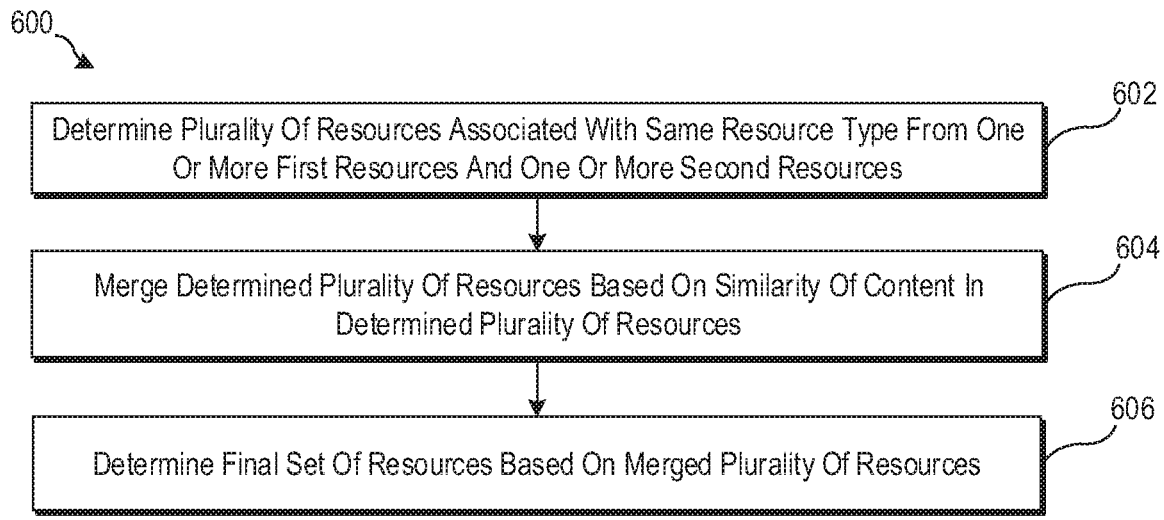
FIG. 6 illustrates a flowchart of an example method for merger of a plurality of resources associated with a same resource type.

FIG. 6 illustrates a flowchart of an example method for merger of a plurality of resources associated with a same resource type from one or more first resources and one or more second resources, arranged in accordance with at least one embodiment described in the present disclosure. FIG. 6 is explained in conjunction with elements from FIG. 1, FIG. 2, FIG. 3A, FIG. 3B, FIG. 3C, FIG. 4, and FIG. 5. With reference to FIG. 6, there is shown a flowchart 600. The method illustrated in the flowchart 600 may start at 602 and may be performed by any suitable system, apparatus, or device, such as by the example electronic device 102 of FIG. 1 or FIG. 2. Although illustrated with discrete blocks, the steps and operations associated with one or more of the blocks of the flowchart 600 may be divided into additional blocks, combined into fewer blocks, or eliminated, depending on the particular implementation.

At block 602, a plurality of resources associated with a same resource type may be determined from the extracted one or more first resources and the one or more second resources. In an embodiment, the processor 204 may be configured to determine the plurality of resources (i.e. that may be associated with the same resource type) from the one or more first resources and the one or more second resources (i.e. extracted at steps 402 and 408 in FIG. 4). The processor 204 may determine a resource type associated with each of the one or more first resources and the one or more second resources, similar to the identification of the set of resource types described in step 404 in FIG. 4. For example, with reference to FIG. 3A of the first website 300A and FIG. 3B of the second website 300B, the processor 204 may determine that a first poster with title "Poster-1" (such as, depicted as a link denoted by 304C) and a second poster with title "Poster-1" (such as, depicted as a link within the related resources field of the first publication, denoted by 316A) may be of the same resource type, i.e., a poster resource type. All the resources in the extracted one or more first resources and the one or more second resources, with same resource type may be considered in the determined plurality of resources.

At block 604, the determined plurality of resources may be merged based on a similarly of content in the determined plurality of resources. In an embodiment, the processor 204 may be configured to merge the determined plurality of resources based on the similarity of content in the determined plurality of resources. In an embodiment, the plurality of resources may have a same URL. In another embodiment, the plurality of resources may have a different URL. In some embodiments, the resources with high similarity of content may have same title or content, but may be extracted from different websites or URLs. The processor 204 may check the similarity of content in the determined plurality of resources based on file comparison. Examples of file comparison techniques may include, but are not limited to, a bit-wise comparison, a file or image compression-based comparison, an MP5 based comparison. Based on the check of similarity of the content between two or more files of a resource, the processor 204 may merge the two or more files and select one of the files, as the file associated with the resource. In an example, the processor 204 may select any of the two or more files in case of an exact match to merge the files of the resource. In another scenario, the processor 204 may select a file of a larger size or a later date of creation or date of change to merge the files of the resource. The processor 204 may merge the resources (i.e. extracted from the one or more first websites 112 and the one or more second websites 114) of the same type and/or of the similar content to avoid redundancy or repetition of same resources to be included the final set of resources (i.e. described at steps 410 and 412 in FIG. 4)

At block 606, the first set of resources may be determined based on the merged plurality of resources. In an embodiment, the processor 204 may be configured to determine the first set of resources based on the merged plurality of resources. For example, with reference to FIGS. 3A and 3B, the processor 204 may merge a first poster "Poster-1" of the first website 300A and a second poster "Poster-1" of the second website 300B as a single poster, such as, the first poster, "Poster-1". In such case, the processor 204 may determine the final set of resources as the first poster "Poster-1" (denoted by 304C in FIG. 3A) and as the "Presentation Slides-1" (such as, depicted as a link within the related resources field of the first publication, denoted by 316A), because the "Poster-1" and the "Presentation Slides-1" correspond to "Title-1" of the searched research paper as shown in FIGS. 3A and 3B. Control may pass to end.

Although the flowchart 600 is illustrated as discrete operations, such as 602, 604, and 606. However, in certain embodiments, such discrete operations may be further divided into additional operations, combined into fewer operations, or eliminated, depending on the particular implementation without detracting from the essence of the disclosed embodiments.

Figure 7:
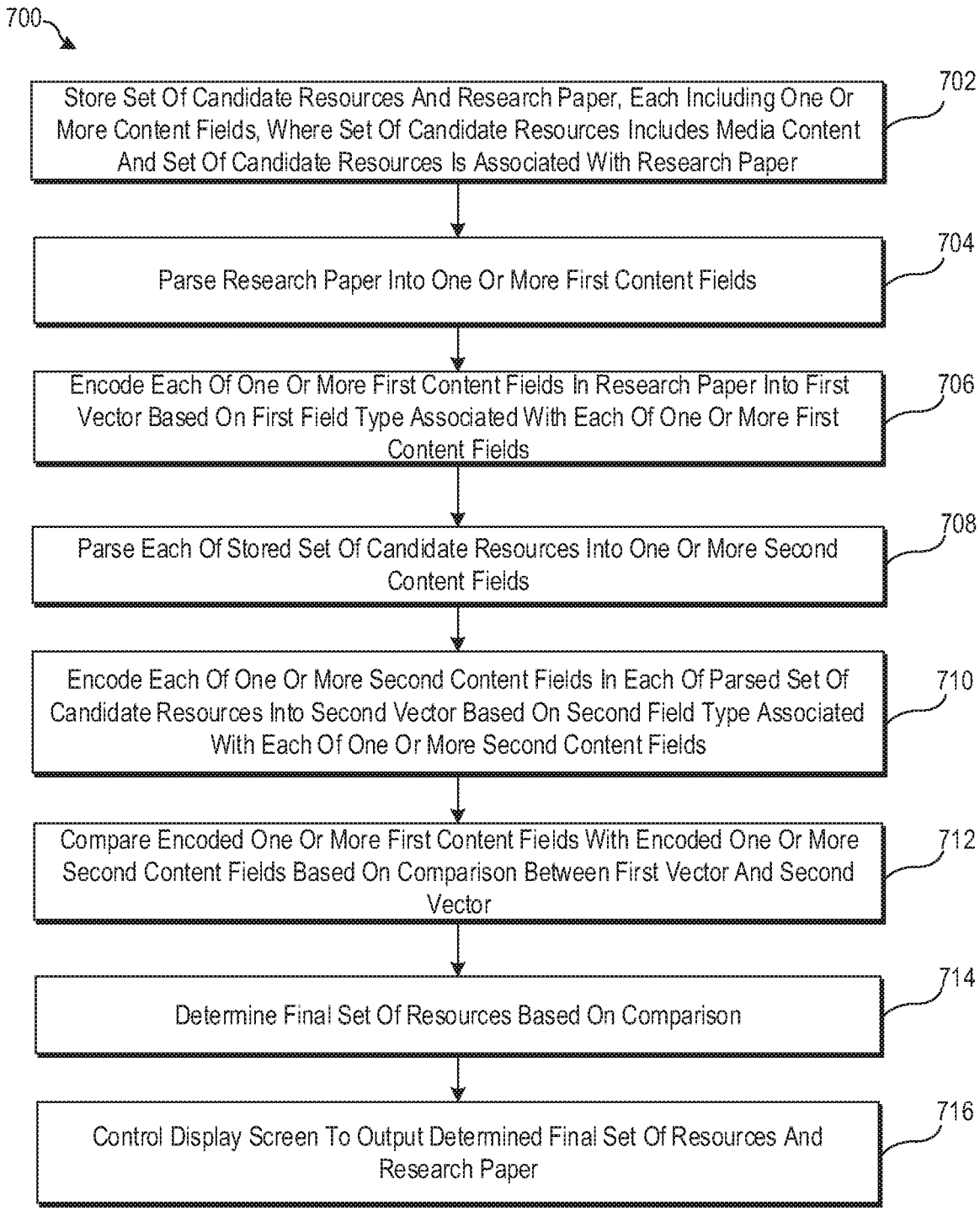
FIG. 7 illustrates a flowchart of an example method for determination of a final set of resources associated with a research paper.

FIG. 7 illustrates a flowchart of an example method for determination of a final set of resources associated with a research paper, arranged in accordance with at least one embodiment described in the present disclosure. FIG. 7 is explained in conjunction with elements from FIG. 1, FIG. 2, FIG. 3A, FIG. 3B, FIG. 3C, FIG. 4, FIG. 5, and FIG. 6. With reference to FIG. 7, there is shown a flowchart 700. The method illustrated in the flowchart 700 may start at 702 and may be performed by any suitable system, apparatus, or device, such as by the example electronic device 102 of FIG. 1 or FIG. 2. Although illustrated with discrete blocks, the steps and operations associated with one or more of the blocks of the flowchart 700 may be divided into additional blocks, combined into fewer blocks, or eliminated, depending on the particular implementation.

At block 702, a set of candidate resources and the research paper may be stored. In an embodiment, the processor 204 may be configured to store each of the set of candidate resources and the research paper in the database 106, the memory 206, or the persistent data storage 208. Each of the set of candidate resources and the research paper may include one or more content fields (for example the one or more first content fields and the one or more second content fields described in FIG. 5). Herein, the set of candidate resources may include the media content, for examples, but is not limited to, a video, a poster, presentation slides, or a program code, which may be associated or related with the research paper (i.e. which may be of interest for a researcher, such the user 116). In an embodiment, the set of candidate resources and the research paper may be extracted from at least one of the one or more first websites 112 or the one or more second websites 114, as described in FIG. 4.

At block 704, the research paper may be parsed into the one or more first content fields. In an embodiment, the processor 204 may be configured to parse the research paper into the one or more first content fields of the research paper. In an embodiment, the processor 204 may parse the research paper into the one or more first content fields based on at least one of a document layout analysis of a page, a document or content file, a textual extraction, a document-to-image conversion, or an object detection as described, for example, in FIGS. 4 and 5.

At block 706, each of the one or more first content fields in the research paper may be encoded into a first vector. In an embodiment, the processor 204 may be configured to encode each of the parsed (or extracted) one or more first content fields in the research paper into the first vector based on a first field type associated with each of the one or more first content fields of the research paper. The first field type may include, but is not limited to, one of a textual field type, a categorical field type, a date-time field type, a figure field type, or a table field type. In an embodiment, the processor 204 may encode the one or more first content fields based on at least one of a pre-trained contextual embedding or a pre-trained bag of embedding for the textual field type, a categorical encoding for the categorical field type, a numeric encoding for the date-time field type, or a pre-trained encoding for the figure field type or for the table field type. In an embodiment, the processor 204 may encode a content field into a vector to shorten the length of the content field to a compressed length such that vectors of two corresponding content fields of the same lengths and types may be compared to compare the corresponding content fields.

For example, the processor 204 may encode both the title and the abstract (i.e. first content field of the textual field type) of the research paper into a vector (such as the first vector) based on a short text pre-trained contextual embedding, such as, but not limited to, Bidirectional Encoder Representations from Transformers (BERT). Further, the processor 204 may encode the full text of the research paper into a vector (such as the first vector) based on a long text pre-trained bag of embedding, such as, but not limited to, word2vec or fasttext. In an example, the processor 204 may encode the author name (i.e. first content field of the categorical field type) of the research paper into a vector (such as the first vector) based on a categorical encoding, such that each author name and/or each institute or organization associated with author(s) may be represented as a separate category. Further, the processor 204 may encode the date of publication (i.e. first content field of the date-time field type) of the research paper into a vector (such as the first vector) based on a numeric encoding. For example, the processor 204 may represent the date of publication as a number that may represent a numeric difference of number of milli-seconds between a predefined date-time (such as 12:00 AM on Jan. 1, 1970) and 12:00 AM (or the actual time of publication) on the date of publication. Further, the processor 204 may encode a figure or table (i.e. first content field of the figured field type or the table field type) in the research paper into a vector (such as the first vector) based on pre-trained encoding, such as, but not limited to, Residual Networks (ResNet) pre-trained model or GoogLeNet pre-trained model.

At block 708, each of the stored set of candidate resources may be parsed into the one or more second content fields. In an embodiment, the processor 204 may be configured to parse each of the stored set of candidate resources into the one or more second content fields. In some embodiments, similar to the parsing of the research paper (as described in step 704), the processor 204 may perform the parsing of posters and presentation slides (as the set of candidate resources) to extract the one or more second content fields (for example title, author name, full text, date of publications, figures or tables). In certain embodiments, the processor 204 may extract the one or more second content fields of a video by extraction of a title, a description, author(s) name, and a date-time of the video post. The processor 204 may be further configured to extract distinct image frames from the video and detect figures and tables in each image frame by object detection based on the deep learning or other neural network models. The processor 204 may be configured to extract the one or more second content fields of a program code by extraction of the author(s) name, a description, a readme text, and a date-time of the program code upload. The parsing of the one or more second content fields also described, for example, in FIGS. 4 and 5.

At block 710, each of the one or more second content fields in each of the parsed set of candidate resources may be encoded into a second vector. In an embodiment, the processor 204 may be configured to encode each of the extracted one or more second content fields (in each of the parsed set of candidate resources) into the second vector based on a second field type associated with each of the one or more second content fields. Similar to the first field type, the second field type may include at least one of the textual field type, the categorical field type, the date-time field type, the figure field type, or the table field type. In an embodiment, similar to the encoding of the one or more first content fields, the processor 204 may encode the one or more second content fields based on at least one of the pre-trained contextual embedding or a pre-trained bag of embedding for the textual field type the of second content fields, the categorical encoding for the categorical field type of the second content fields, the numeric encoding for the date-time field type of the second content fields, or the pre-trained encoding for the figure field type or for the table field type of the second content fields. The encoding of the one or more second content fields may be similar to the encoding of the one or more first content fields based on the corresponding field types for each content field in the set of candidate resources, as described in step 706.

At block 712, the encoded one or more first content fields may be compared with the encoded one or more second content fields based on a comparison between the first vector and the second vector. In an embodiment, the processor 204 may be configured to compare the encoded one or more first content fields with the one or more second content fields based on the comparison between the first vectors of the corresponding first content fields of the research paper and the second vectors of the corresponding second content fields of the set of candidate resources. In an embodiment, the first vector (related to the first content fields of the research paper) may include a set of first textual features associated with content fields of the textual field type (e.g., title, abstract, and full text) and a set of first categorical features associated with content fields of the categorical field type (e.g., authors). The first vector may further include a set of first numeric features associated with content fields of a date-time field type (e.g., date of publication) and a set of first Siamese neural network features associated with content fields of a figure field type (e.g., a figure) or table field type (e.g., a table). Similarly, the second vector (related to the second content fields of the set of candidate resources) may include a set of second textual features associated with content fields of the textual field type and a set of second categorical features associated with content fields of the categorical field type. The second vector may further include a set of second numeric features associated with content fields of a date-time field type and a set of second Siamese neural network features associated with content fields of a figure or table field type.

The processor 204 may be configured to compare the first vector (i.e. for each of the encoded one or more first content fields) with the second vector for (i.e. for each of the encoded one or more second content fields) based on a comparison of the corresponding sets of features. For example, the processor 204 may compare the set of first textual features with the set of second textual features, and the set of first categorical features with the set of second categorical features. Further, the processor 204 may compare the set of first numeric features with the set of second numeric features, and the set of first Siamese neural network features with the set of second Siamese neural network features. The comparison of the first vector with the second vector is described further, for example, in FIG. 8.

At block 714, the final set of resources may be determined based on the comparison between the first vector for each of the encoded one or more first content fields of the research paper, and the corresponding second vector for each of the encoded one or more second content fields of the set of candidate resources. In an embodiment, the processor 204 may be configured to determine the final set of resources based on the comparison between the first vector and the second vector. The determination of the final set of resources is explained further, for example, in FIG. 8.

At block 716, a display screen may be controlled to output the determined the final set of resources and the research paper. In an embodiment, the processor 204 may be configured to control the display screen (such as, the display screen 212 of the electronic device 102) to output the determined final set of resources and the research paper. In some embodiments, the processor 204 may output an integrated UI that may display the final set of resources and the research paper together on the display screen 212, (for example as the multi-modal output). An exemplary integrated UI that may display the final set of resources and the research paper is described further, for example, in FIG. 9. Control may pass to end.

Although the flowchart 700 is illustrated as discrete operations, such as 702, 704, 706, 708, 710, 712, 714, and 716. However, in certain embodiments, such discrete operations may be further divided into additional operations, combined into fewer operations, or eliminated, depending on the particular implementation without detracting from the essence of the disclosed embodiments.

Figure 8:
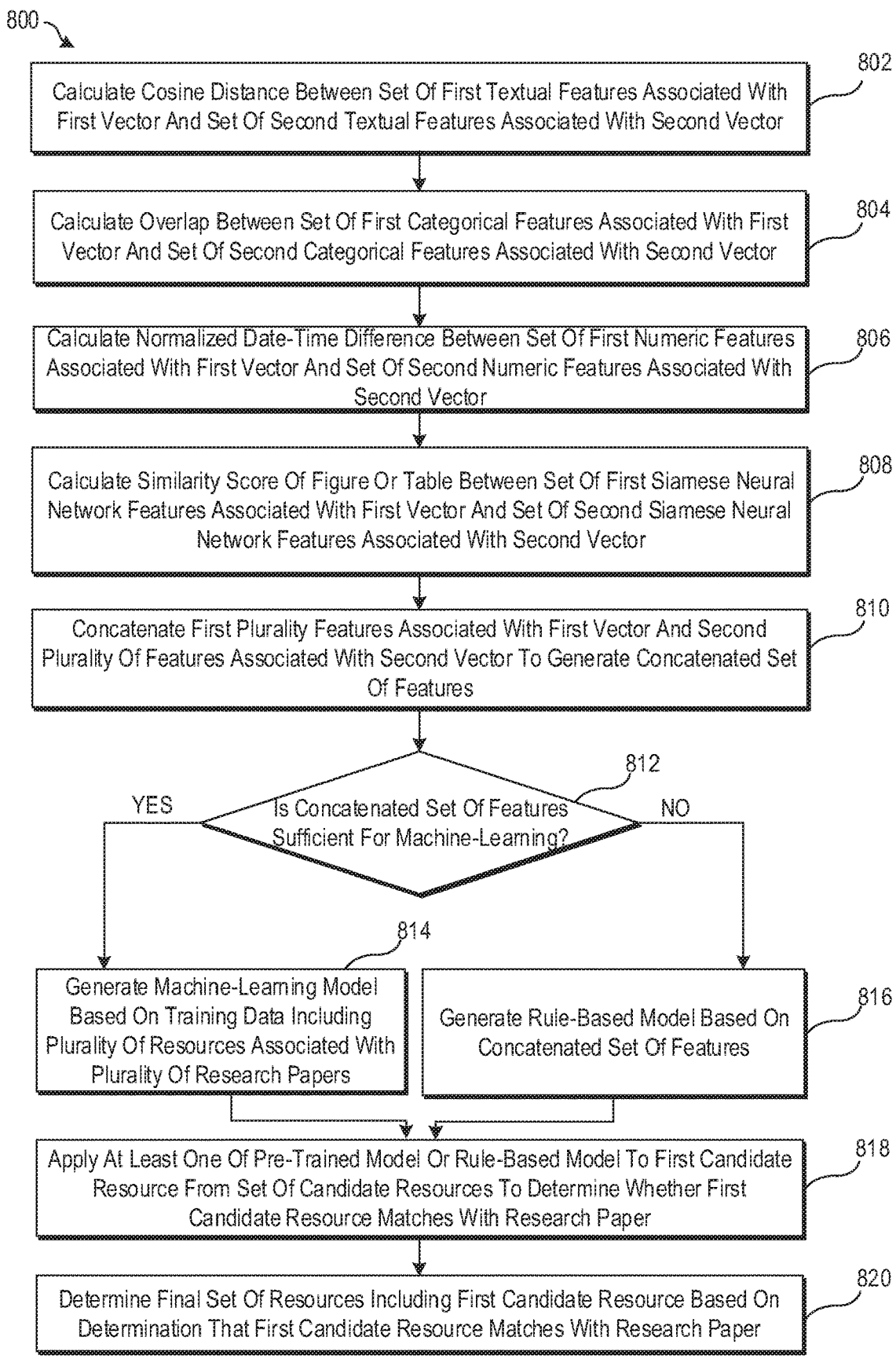
FIG. 8 illustrates a flowchart of an example method for determination of a final set of resources associated with a research paper.

FIG. 8 illustrates a flowchart of an example method for determination of a final set of resources associated with a research paper, arranged in accordance with at least one embodiment described in the present disclosure. FIG. 8 is explained in conjunction with elements from FIG. 1, FIG. 2, FIG. 3A, FIG. 3B, FIG. 3C, FIG. 4, FIG. 5, FIG. 6, and FIG. 7. With reference to FIG. 8, there is shown a flowchart 800. The method illustrated in the flowchart 800 may start at 802 and may be performed by any suitable system, apparatus, or device, such as by the example electronic device 102 of FIG. 1 or FIG. 2. Although illustrated with discrete blocks, the steps and operations associated with one or more of the blocks of the flowchart 800 may be divided into additional blocks, combined into fewer blocks, or eliminated, depending on the particular implementation.

At block 802, a cosine distance between the set of first textual features associated with the first vector and the set of second textual features associated with the second vector may be calculated. In an embodiment, the processor 204 may be configured to calculate the cosine distance between the set of first textual features associated with the first vector and the set of second textual features associated with the second vector for the comparison described, for example, in step 712 in FIG. 7. The cosine distance may be represented by the following equation (1):

$$\cos\theta = \frac{A \cdot B}{\|A\|\|B\|} = \frac{\sum_{i=1}^{n} A_i B_i}{\sqrt{\sum_{i=1}^{n} A_i} \sqrt{\sum_{i=1}^{n} B_i}} \quad (1)$$

For example, the value of the cosine distance between the set of first textual features (e.g., a feature-set vector "A") associated with the first vector and the set of second textual features (e.g., a feature-set vector "B") associated with the second vector may lie between "0" and "1". In an embodiment, a value of cosine distance nearer to '1' or a small cosine angle of difference (i.e., an angle of difference closer to 0°) between the feature-set vector 'A' and the feature-set vector 'B' may indicate a greater similarity between the set of first textual features and the set of second textual features. In an example, the processor 204 may determine the similarity between the title of the research paper and title of each of the set of candidate resources based on the calculation of the cosine distance, as described at step 802.

At block 804, an overlap between the set of first categorical features associated with the first vector and the set of second categorical features associated with the second vector may be calculated. In an embodiment, the processor 204 may be configured to calculate the overlap between the set of first categorical features associated with the first vector and the set of second categorical features associated with the second vector for the comparison described, for example, in step 712 in FIG. 7. For example, for the content field of the author (with the categorical field type), the processor 204 may compare each individual author name of the research paper with the author(s) name of the set of candidate resources to determine a number of common authors. The processor 204 may calculate the overlap based on a match of at least one author as being common to the research paper and the set of candidate resources. In case two authors are common between the research paper and the set of candidate resources, the processor 204 may calculate the overlap as two, and so on.

At block 806, a normalized date-time difference between the set of first numeric features associated with the first vector and the set of second numeric features associated with the second vector may be calculated. In an embodiment, the processor 204 may be configured to calculate the normalized date-time difference between the set of first numeric features associated with the first vector and the set of second numeric features associated with the second vector for the comparison described, for example, in step 712 in FIG. 7. In an embodiment, the processor 204 may be configured to normalize a numeric value of the date-time associated with each of the set of first numeric features and the set of second numeric features. For example, the set of first numeric features and the set of second numeric features may be numeric representations of a first date-time (i.e. the first content field in the research paper and a second date-time (i.e. the second content field of the set of candidate resources), respectively. The numeric representation of the first date-time and the second date-time may be a numeric difference between a number of milli-seconds between the predefined date-time (such as 12:00 AM on Jan. 1, 1970) and the corresponding date-time. The processor 204 may normalize the numeric representation of each of the first date-time and the second date-time based on a division of the numeric representation of each of the first date-time and the second date-time with a predefined numeric value. The processor 204 may perform a difference between the normalized first date-time and the second date-time to calculate the normalized date-time difference between the set of first numeric features associated with the first vector and the set of second numeric features associated with the second vector.

At block 808, a similarity score of a figure or table between the set of first Siamese neural network features associated with the first vector and the set of second Siamese neural network features associated with the second vector may be calculated. In an embodiment, the processor 204 may be configured to calculate the similarity score of the figure or table between the set of first Siamese neural network features associated with the first vector and the set of second Siamese neural network features associated with the second vector for the comparison described, for example, in step 712 in FIG. 7. In an embodiment, the processor 204 may perform a pattern matching based on application of a multiple neural network models (e.g., deep learning) on the set of first Siamese neural network features and the set of second Siamese neural network features. Based on the pattern matching, the processor 204 may determine the similarity score (e.g., a real number between 0 to 1) as a measure of similarity between figures or tables in the research paper and a corresponding resource in the set of candidate resources.

At block 810, a first plurality of features associated with the first vector and a second plurality of features associated with the second vector may be concatenated to generate a concatenated set of features. In an embodiment, the processor 204 may be configured to concatenate the first plurality of features associated with the first vector and the second plurality of features associated with the second vector to generate the concatenated set of features. Herein, each of the first plurality of features and the second plurality of features may include at least one of a set of textual features, a set of categorical features, a set of numeric features, or a set of Siamese neural network features. For example, the concatenated set of features may include the set of first textual features, the set of second textual features, the set of first categorical features, the set of second categorical features, the set of first numeric features, the set of second numeric features, the set of first Siamese neural network features, and the set of second Siamese neural network features. In an embodiment, the concatenated set of features may also include values of the calculated cosine distance (at step 802), the calculated overlap (at step 804), the calculated normalized date-time difference (at step 806), and the calculated similarity score (at step 808).

At block 812, it may be determined whether the concatenated set of features is sufficient for machine-learning. In an embodiment, the processor 204 may be configured to determine whether the concatenated set of features is sufficient for training a machine-learning model. In an example, the processor 204 may determine a number of research papers in the database 106 for which the concatenated set of features are generated. In case the determined number of research papers is greater than a predetermined threshold, the processor 204 may determine that the concatenated set of features may be sufficient for machine-learning. In such case, control may pass to step 814. Otherwise, control may pass to step 816.

At block 814, a machine-learning model may be generated based on training data including a plurality of resources associated with a plurality of research papers. In an embodiment, the processor 204 may be configured to generate the machine-learning model based on the training data including the plurality of resources associated with the plurality of research papers. The plurality of research papers may include the research paper, and the plurality of resources may include the final set of resources. For example, the training data may include a data set of resources with a pre-determined association with corresponding research papers in a data set of research papers. The processor 204 may be configured to extract the training data from at least one of the one or more first websites 112 or the one or more second websites 114.

Examples of the machine-learning model may be a classifier or regression model which may be generated based on training to identify a relationship between inputs, such as features in the training data (including research papers and resources) and output labels (such as, a match or a non-match between a research paper and a resource). The machine-learning model may be defined by its hyper-parameters, for example, number of weights, cost function, input size, number of layers, and the like. The hyper-parameters of the machine learning model may be tuned and weights may be updated so as to move towards a global minima of a cost function for the machine learning model. After several epochs of the training on the feature information in the training data, the machine-learning model may be trained to output a prediction/classification result (e.g., a match or non-match output) for a set of inputs (e.g., a research paper and a resource). A prediction result of the machine-learning model may be indicative of a class label (e.g., a match or non-match output) for each input of the set of inputs (e.g., input features extracted from new/unseen instances of a research paper and a resource).

At 816, a rule-based model may be generated based on the concatenated set of features. In an embodiment, the processor 204 may be configured to generate the rule-based model based on the concatenated set of features. In an example, the processor 204 may generate the rule-based model which may indicate that a resource may be a match with a research paper when: the calculated cosine distance for textual features is greater than "0.5", the calculated overlap for categorical features is greater than to "2.0", the calculated normalized date-time difference is less than "0.1", and the calculated similarity score is greater than "0.3".

At 818, at least one of a pre-trained model (e.g., the machine-learning model) or the rule-based model may be applied to a first candidate resource from the set of candidate resources to determine whether the first candidate resource matches with the research paper. The processor 204 may be configured to apply at least one of the pre-trained model (e.g., the machine-learning model) or the rule-based model to the first candidate resource from the set of candidate resources. Based on the application of one of the pre-trained model or the rule-based model to the first candidate resource, the processor 204 may determine whether the first candidate resource matches with the research paper or not.

At block 820, the final set of resources including the first candidate resource may be determined based on the determination that the first candidate resource matches with the research paper. In an embodiment, the processor 204 may determine that the final set of resources may include the first candidate resource based on the determination that the first candidate resource matches with the research paper. If the first candidate resource matches with the research paper, the processor 204 may add the first candidate resource to the final set of resources. The processor 204 may thereby determine the final set of resources that may match with the research paper. Thus, the processor 204 of the disclosed electronic device 102 may automatically extract and match multi-modal online resources (i.e. presentation slides, video, postures, or program codes of different resource types) for the research paper of interest for the user 116 (for example researcher). The processor 204 may aggregate such extracted and matched multi-modal online resources and display the online resources with the research paper in an integrated UI, as described further, for example, in FIG. 9.

Although the flowchart 800 is illustrated as discrete operations, such as 802, 804, 806, 808, 810, 812, 814, 816, 818, and 820. However, in certain embodiments, such discrete operations may be further divided into additional operations, combined into fewer operations, or eliminated, depending on the particular implementation without detracting from the essence of the disclosed embodiments.

Figure 9:
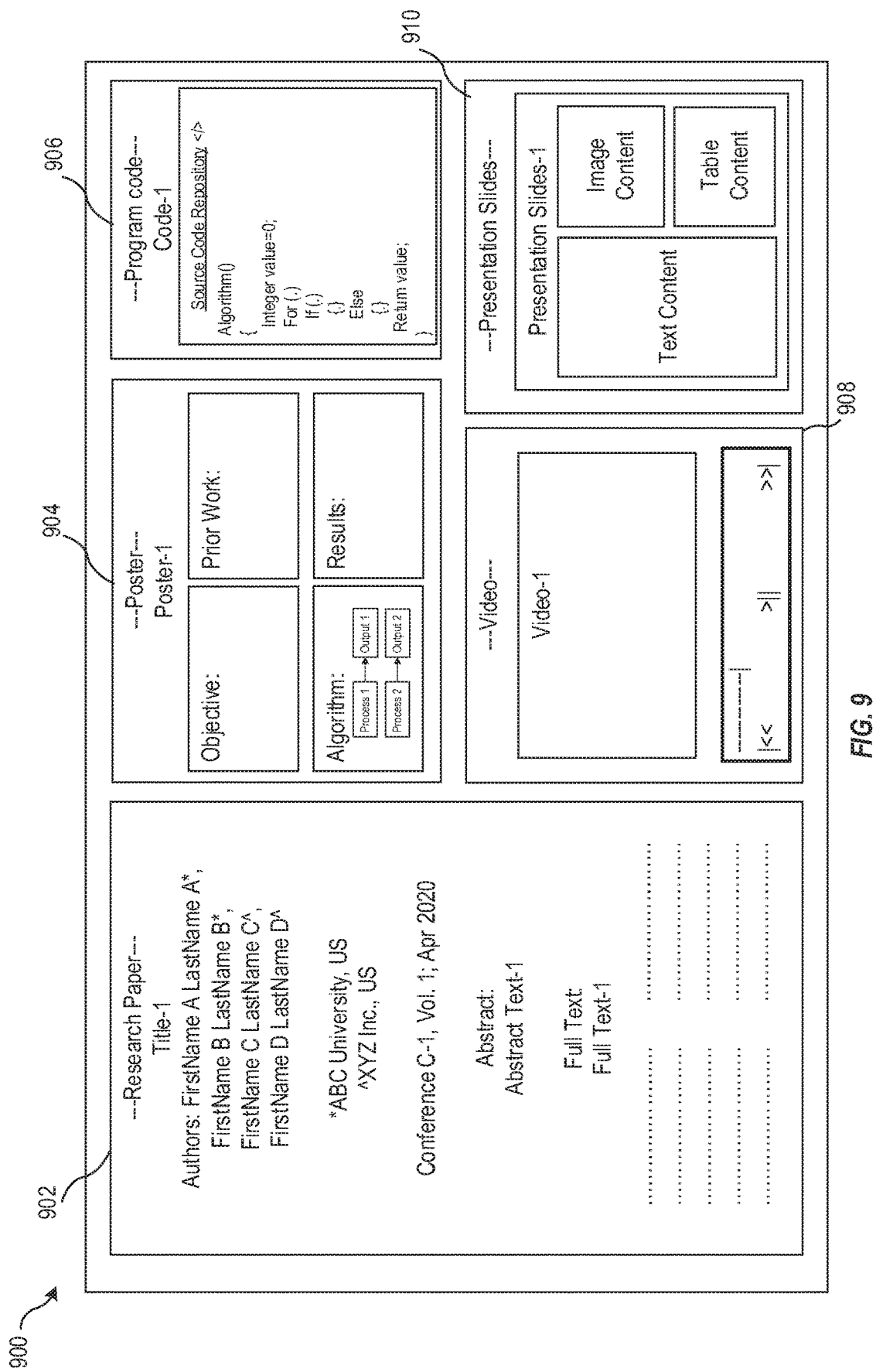
FIG. 9 illustrates an exemplary user interface (UI) that may display a final set of resources with the research paper, all according to at least one embodiment described in the present disclosure.

FIG. 9 illustrates an exemplary user interface (UI) that may display a final set of resources with the research paper, arranged in accordance with at least one embodiment described in the present disclosure. FIG. 9 is explained in conjunction with elements from FIG. 1, FIG. 2, FIG. 3A, FIG. 3B, FIG. 3C, FIG. 4, FIG. 5, FIG. 6, FIG. 7, and FIG. 8. With reference to FIG. 9, there is shown an integrated UI 900. The integrated UI 900 may include a first research paper 902, a first poster 904, a first program code 906, a first video 908, and a first presentation slide(s) 910.

For example, as shown in FIG. 9, the first research paper 902 may include a title (e.g., "Title-1"), authors names (e.g., FirstName A LastName A, FirstName B LastName B, FirstName C LastName C, and FirstName D LastName D), affiliation information (e.g., "ABC University US" associated with FirstName A LastName A and FirstName B LastName B; and "XYZ Inc. US" associated with FirstName C LastName C and FirstName D LastName D), conference volume information (e.g., "Conference C-1, Vol. 1"), and date of publication (e.g., "April 2020"). The first research paper 902 may further include an abstract (e.g., "Abstract Text-1") and a full text (e.g., "Full Text-1"). In an embodiment, the integrated UI 900 may provide a hyperlink to download the first research paper 902 or to open the first research paper 902 in another user interface.

FIG. 9 further depicts the first poster 904 (e.g., "Poster-1") that may include infographics related to the first research paper 902. In an example, the infographics may include a first section including objectives of the research, a second section including prior work associated with the research, a third section including an overview of the algorithm associated with the research (e.g., a process-output graph), and a fourth section including results of the research as shown in FIG. 9. The integrated UI 900 may provide a link to download the first poster 904.

There is further shown in FIG. 9, the first program code 906 (e.g., "Code-1") that may depict a representative algorithm or source code associated with the first research paper 902, written in a certain programming language (e.g., C, C++, Java, C# .NET, Python, or an assembly language). In an embodiment, the integrated UI 900 may include an integrated or embedded debugger or execution environment (such as, a Java Virtual Machine) to debug and/or execute the first program code 906 in a real-time and provide an output to the user 116. The integrated UI 900 may further provide an interface to the user 116 to edit the first program code 906 in real-time and export the first program code 906 to another Integrated Development Environment (IDE). In an embodiment, the integrated UI 900 may include a link to a source code repository that may host the first program code 906. In another embodiment, the integrated UI 900 may embed a web page of the source code repository associated with the first program code 906.

There is further shown in FIG. 9, the first video 908 (e.g., "Video-1") that may depict multi-media (e.g., audio/video) content associated with the first research paper 902. The integrated UI 900 may include a video player to play-back the first video 908 based on a user input from the user 116. The first video 908 may represent the content of the first research paper 902 and/or may include a commentary (including closed captioned texts) for the description of the concepts related to the research paper. The integrated UI 900 may provide a link to download the first video 908.

There is further shown in FIG. 9, the first presentation slides 910 (e.g., "Presentation Slides-1") that may depict multi-media content (e.g., a presentation slide deck with graphics, animation, voice-over, commentary, and/or text) associated with the first research paper 902. The integrated UI 900 may include a slide player to present the first presentation slides 910 to the user 116. The integrated UI 900 may provide a link to download the first presentation slides 910.

It should be noted that the integrated UI 900, the first research paper 902, the first poster 904, the first program code 906, the first video 908, and the first presentation slide 910 shown in FIG. 9 are presented merely as examples and should not be construed to limit the scope of the disclosure.

Typically, a researcher may understand the state of art of a domain of interest by study of multiple research papers of the domain of interest. However, this may be tedious to analyze every such research paper. Hence, the researcher may search for online resources associated with each research paper to get a quick overview of the research papers or the related domain. The researcher may have to manually search and extract each online resource related to the research papers from multiple websites or search engines that may be scattered across the Internet. Further, the researcher may have to manually compare content available from each online resource, with the research papers to establish a correlation between the online resources and the research papers to further determine whether an extracted online resource actually corresponds to a certain research paper of interest or not. As may be evident, the manual process of extraction of the online resources associated with a research paper may be time consuming and may not scale well to a batch of a large number of research papers. Therefore, the disclosed electronic device 102 may provide automated extraction of multi-modal online resources including the media content (poster, video, slides, or codes) which may be associated with a research paper, and may further provide automated validation that the extracted online resources correspond to (or match with) the research paper, in comparison to conventional solutions of manual extraction and validation of the online resources. Further, the disclosed electronic device 102 may provide an integrated UI (e.g., the integrated UI 900 in FIG. 9) for an integrated or user friendly display of the multi-modal online resources (e.g., posters, videos, presentation slides, and program codes) along with the research paper associated with the multi-modal online resources. Such integrated UI, as shown for example, in FIG. 9 may provide a dashboard-based interface to the researcher (i.e. user 116) to study the online resources (i.e. matched with a target research paper) together with the research paper and efficiently organize the displayed online resources on the integrated UI. The automatic extraction, validation, and the integrated UI provided by the disclosed electronic device 102 may further provide a better and enhanced understanding of the research paper and the domain of interest associated with the research paper, while saving substantial time for the user 116 (i.e. researcher or any knowledge worker) to search and collate such resources.

Various embodiments of the disclosure may provide one or more non-transitory computer-readable storage media configured to store instructions that, in response to being executed, cause a system (such as the example electronic device 102) to perform operations. The operations may include extracting, from one or more first websites, one or more first resources based on a title associated with a research paper. The operations may further include identifying a set of resource types associated with the extracted one or more first resources. The operations may further include determining one or more first resource types from a predefined plurality of resource types based on the identified set of resource types. The set of resource types may exclude the determined one or more first resource types. The operations may further include extracting, from one or more second websites, one or more second resources, associated with the determined one or more first resource types, based on the title associated with the research paper. Each of the one or more first resources and the one or more second resources comprises media content. The operations may further include determining a final set of resources based on a comparison between one or more first content fields of the research paper and one or more second content fields of the extracted one or more first resources and the extracted one or more second resources. The operations may further include controlling a display screen to output the determined final set of resources and the research paper.

Various other embodiments of the disclosure may provide one or more non-transitory computer-readable storage media configured to store instructions that, in response to being executed, cause a system (such as the example electronic device 102) to perform operations. The operations may include storing a set of candidate resources and a research paper, each including one or more content fields. The set of candidate resources may include media content and the set of candidate resources may be associated with the research paper. The operations may further include encoding each of one or more first content fields in the research paper into a first vector based on a first field type associated with each of the one or more first content fields. The operations may further include parsing each of the stored set of candidate resources into one or more second content fields. The operations may further include encoding each of the one or more second content fields in each of the parsed set of candidate resources into a second vector, based on a second field type associated with each of the one or more second content fields. The operations may further include comparing the first vector for each of the encoded one or more first content fields with the second vector for each of the encoded one or more second content fields. The operations may further include determining a final set of resources based on the comparison. The operations may further include controlling a display screen to output the determined final set of resources and the research paper.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
   extracting, from one or more first websites, one or more first resources based on a title associated with a research paper;
   identifying a set of resource types associated with the extracted one or more first resources;
   determining one or more first resource types from a predefined plurality of resource types based on the identified set of resource types, the set of resource types exclude the determined one or more first resource types, the predefined plurality of resource types comprises at least one of: a research paper type, a poster type, a presentation slide type, a video type, or a program code type;
   extracting, from one or more second websites, one or more second resources, associated with the determined one or more first resource types, based on the title associated with the research paper, each of the one or more first resources and the one or more second resources comprises media content;
   determining a final set of resources based on a comparison between one or more first content fields of the research paper and one or more second content fields of the extracted one or more first resources and the extracted one or more second resources, the determining being based on when the comparison results in the one or more first content fields matching the one or more second content fields; and
   controlling a display screen to output the determined final set of resources and the research paper.

2. The method according to claim 1, wherein the one or more first websites comprise at least one of: a first website associated with a conference or journal of research papers, a second website associated with an author or publisher of research papers, or a third website associated with a resource type.

3. The method according to claim 1, further comprising extracting one or more first meta fields from the research paper and one or more second meta fields from each of the one or more first resources and the one or more second resources.

4. The method according to claim 1, further comprising extracting the one or more first content fields and the one or more second content fields based on text extraction, wherein each of the one or more first content fields and the one or more second content fields comprises textual content.

5. The method according to claim 1, further comprising:
   extracting the one or more first content fields and the one or more second content fields based on object detection, wherein each of the one or more first content fields and the one or more second content fields corresponds to at least one of figure content or tabular content as an object.

6. The method according to claim 1, further comprising:
   determining a plurality of resources associated with a same resource type from the extracted one or more first resources and the extracted one or more second resources;
   merging the determined plurality of resources, based on a similarity of content in the determined plurality of resources; and
   determining the final set of resources based on the merged plurality of resources.

7. One or more non-transitory computer-readable storage media configured to store instructions that, in response to being executed, cause a system to perform operations, the operations comprising:
   extracting, from one or more first websites, one or more first resources based on a title associated with a research paper;
   identifying a set of resource types associated with the extracted one or more first resources;
   determining one or more first resource types from a predefined plurality of resource types based on the identified set of resource types, the set of resource types excludes the determined one or more first resource types, the predefined plurality of resource types comprises at least one of: a research paper type, a poster type, a presentation slide type, a video type, or a program code type;

extracting, from one or more second websites, one or more second resources, associated with the determined one or more first resource types, based on the title associated with the research paper, wherein each of the one or more first resources and the one or more second resources comprises media content;

determining a final set of resources based on a comparison between one or more first content fields of the research paper and one or more second content fields of the extracted one or more first resources and the extracted one or more second resources, the determining being based on when the comparison results in the one or more first content fields matching the one or more second content fields; and controlling a display screen to output the determined final set of resources and the research paper.

8. The non-transitory computer-readable storage media according to claim 7, wherein the one or more first websites comprise at least one of: a first website associated with a conference or journal of research papers, a second website associated with an author or publisher of research papers, or a third website associated with a resource type.

9. The non-transitory computer-readable storage media according to claim 7, further comprising extracting one or more first meta fields from the research paper and one or more second meta fields from each of the one or more first resources and the one or more second resources.

10. The non-transitory computer-readable storage media according to claim 7, further comprising extracting the one or more first content fields and the one or more second content fields based on text extraction, wherein each of the one or more first content fields and the one or more second content fields comprises textual content.

11. The non-transitory computer-readable storage media according to claim 7, further comprising:
   extracting the one or more first content fields and the one or more second content fields based on object detection, wherein each of the one or more first content fields and the one or more second content fields corresponds to at least one of figure content or tabular content as an object.

12. The non-transitory computer-readable storage media according to claim 7, further comprising:
   determining a plurality of resources associated with a same resource type from the extracted one or more first resources and the extracted one or more second resources;
   merging the determined plurality of resources, based on a similarity of content in the determined plurality of resources; and
   determining the final set of resources based on the merged plurality of resources.

* * * * *